(12) United States Patent
Yamashita et al.

(10) Patent No.: US 7,578,607 B2
(45) Date of Patent: Aug. 25, 2009

(54) LIGHT DEFLECTOR AND LIGHT SOURCE DEVICE

(75) Inventors: Tomoyoshi Yamashita, Kanagawa (JP); Masae Ono, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 550 days.

(21) Appl. No.: 10/538,008

(22) PCT Filed: Nov. 28, 2003

(86) PCT No.: PCT/JP03/15282

§ 371 (c)(1), (2), (4) Date: Jun. 3, 2005

(87) PCT Pub. No.: WO2004/053539

PCT Pub. Date: Jun. 24, 2004

(65) Prior Publication Data

US 2008/0055926 A1 Mar. 6, 2008

(30) Foreign Application Priority Data

Dec. 6, 2002 (JP) ............................. 2002-355275
Feb. 5, 2003 (JP) ............................. 2003-028387

(51) Int. Cl. *F21V 5/02* (2006.01)

(52) U.S. Cl. ..................... 362/339; 362/606; 362/303; 362/615

(58) Field of Classification Search ................. 362/626, 362/606–607, 615, 620, 614, 26–27, 339, 362/97.1; 349/62–63, 65; 359/834
See application file for complete search history.

(56) References Cited

U.S. PATENT DOCUMENTS 5,711,589 A * 1/1998 Oe et al. ..................... 362/620

(Continued)

FOREIGN PATENT DOCUMENTS

JP 7-8804 2/1995

(Continued)

*Primary Examiner*—Jacob Y Choi
*Assistant Examiner*—Robert May
(74) *Attorney, Agent, or Firm*—Morgan, Lewis & Bockius LLP

(57) ABSTRACT

A planar light source device has a primary light source (1), a light guide (3) having a light incident surface (31) on which light emitted from the primary light source (1) is incident and a light emitting surface (33) for emitting light guided in the light guide, and a light deflector (4) opposed to the light emitting surface of the light guide. The light deflector (4) has a light input surface (41) to which light is inputted and a light output surface (42) which is disposed on the opposite side of the light input surface and outputs the inputted light. Elongated prisms each having two prism faces are arranged in parallel to each other on the light input surface (41). At least one of the two prism faces is a non-single planar surface. The vertex split angle α of one of the prism faces is 2 to 25 degrees, and the vertex split angle β of the other prism face is 33 to 40 degrees. The difference (|α−β|) between the vertex split angle α and the vertex split angle β is 8 to 35 degrees. As a result, the output light distribution is controlled and narrowed. Thus, a light source device having an improved ratio of utilization of the amount of light from the primary light source, a simplified structure, and an improved image definition is produced.

33 Claims, 16 Drawing Sheets

U.S. PATENT DOCUMENTS

| | | | | |
|---|---|---|---|---|
| 5,890,791 | A * | 4/1999 | Saito | 362/620 |
| 6,011,602 | A * | 1/2000 | Miyashita et al. | 349/65 |
| 6,384,881 | B1 * | 5/2002 | Arai et al. | 349/65 |
| 2002/0163790 | A1 * | 11/2002 | Yamashita et al. | 362/31 |

FOREIGN PATENT DOCUMENTS

| | | |
|---|---|---|
| JP | 7-230002 | 8/1995 |
| JP | 8-304607 | 11/1996 |
| JP | 9-105804 | 4/1997 |
| JP | 9-507584 | 7/1997 |
| JP | 10-254371 | 9/1998 |
| JP | 2001-143515 | 5/2001 |
| JP | 2002-197908 | 7/2002 |
| WO | WO 94/20871 | 9/1994 |

* cited by examiner

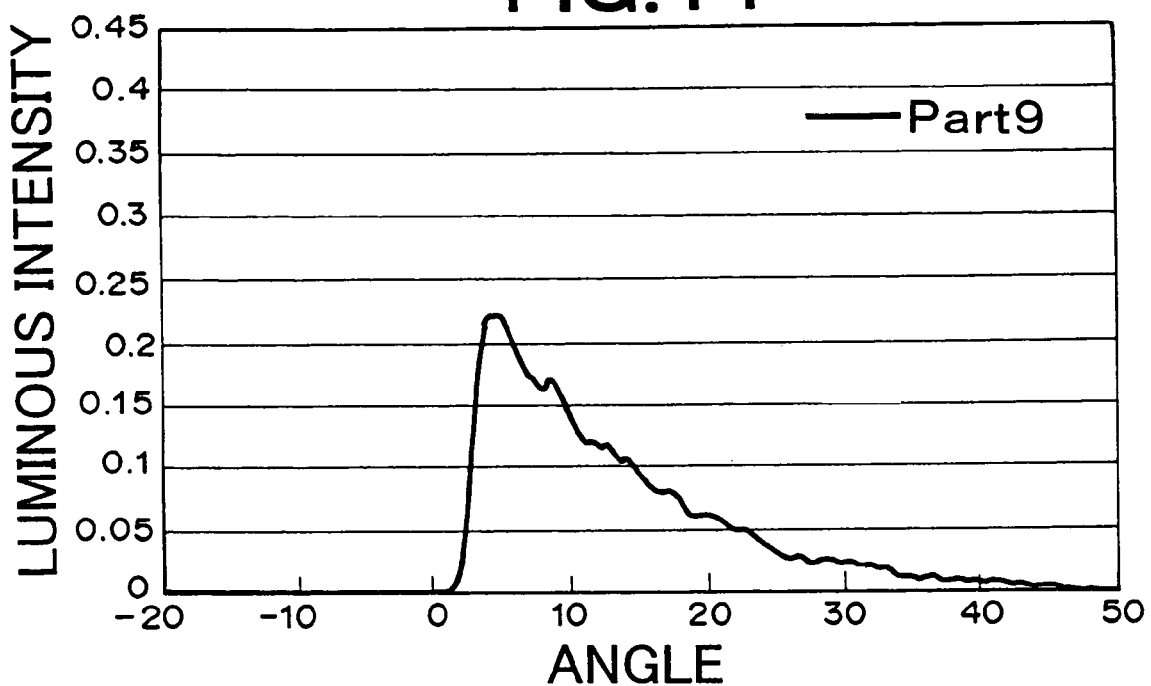
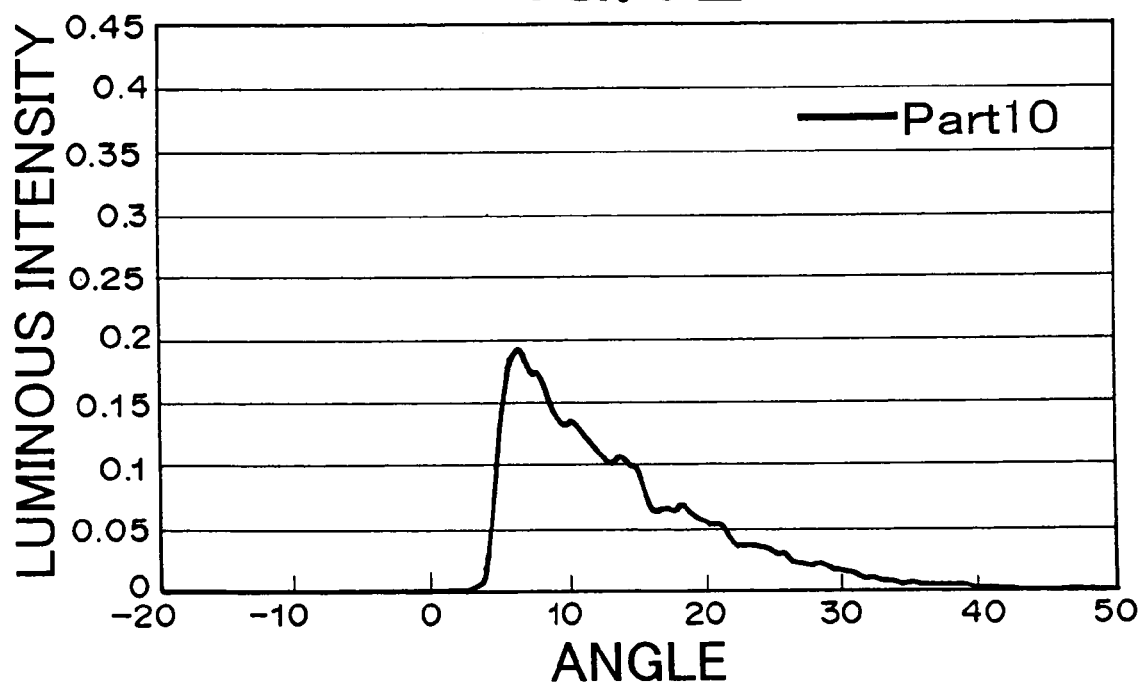

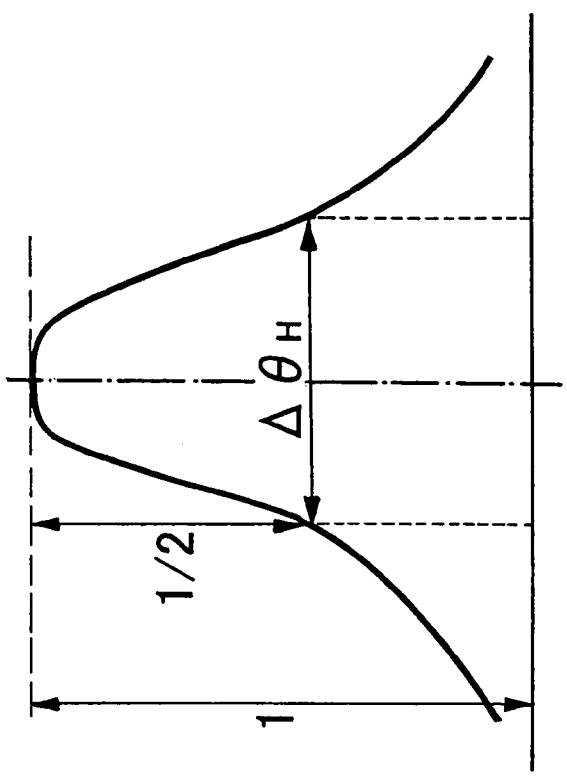
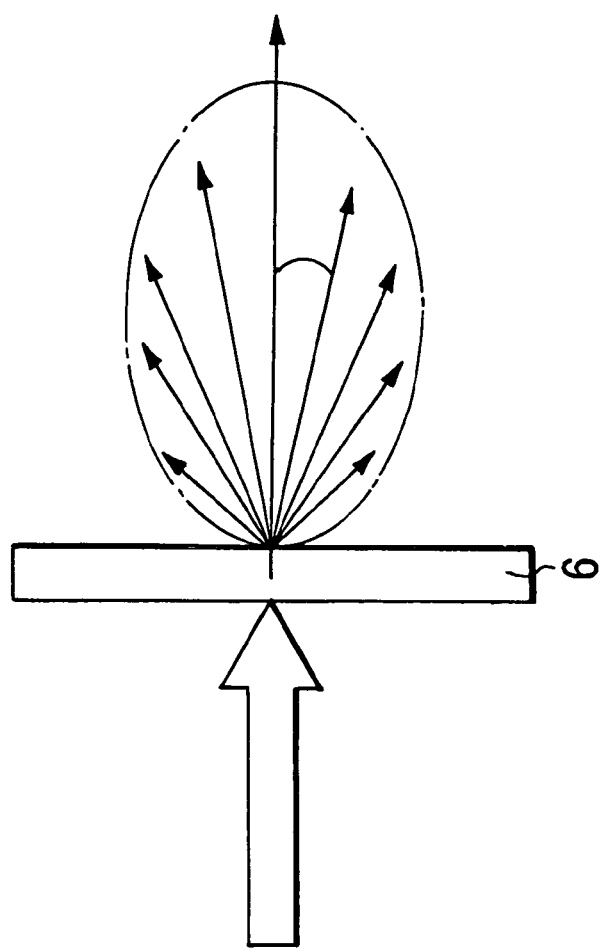
FIG.19

LIGHT DEFLECTOR AND LIGHT SOURCE DEVICE

TECHNICAL FIELD

This invention relates to an edge-light type light source device that can be used in a liquid crystal display apparatus operating as display section in a notebook-sized personal computer, a liquid crystal television set, a portable telephone or a personal digital assistant and also to a light deflector that can be used in such a light source device. More particularly, the present invention relates to an improvement in the light deflector arranged at the light emitting surface side of a light guide of such a light source device.

BACKGROUND ART

Color liquid crystal display apparatus have been expanding the market in recent years as monitors of personal computers including notebook-sized personal computers, and as display sections of liquid crystal television sets including those with an incorporated video player, portable telephones, personal digital assistants and the like. Efforts are being paid to develop high resolution liquid crystal display apparatus having a large size display screen in order to accommodate the increased volume of information to be processed by liquid crystal display apparatus and the diversified demand for liquid crystal display apparatus including the demand for those adapted to a multimedia environment.

A liquid crystal display apparatus basically comprises a backlight unit and a liquid crystal display element part. The backlight unit can be of an under-light type where the primary light source is arranged right under the liquid crystal display element part or of an edge-light type where the primary light source is arranged vis-à-vis a lateral face of the light guide. An edge-light type backlight unit is widely used from the viewpoint of downsizing of the liquid display apparatus.

In the case of relatively small-sized liquid crystal display apparatus that are produced as display sections of portable telephones and other relatively small display sections and adapted to be viewed in a relatively narrow angular range, the backlight units of the edge-light type are designed to limit the diverging angle of the light emitted from the display screen and emit light intensively within a required angular range in order to effectively utilize the quantity of light emitted from the primary light source in the viewpoint of reduction of power consumption.

JP (A)-2001-143515 proposes a light source device adapted to be used with a display apparatus having a limited angular viewing range and designed to emit light intensively within a relatively narrow angular range in order to raise the efficiency of utilization of light from the primary light source and reduce the power consumption by using a prism sheet having elongated prism forming surfaces on the opposite surfaces thereof that is located adjacent to the light emitting surface of the light guide. A plurality of elongated prisms that run in parallel with each other are arranged on each of the opposite surfaces of the prism sheet including a light input surface and a light output surface, the direction of the elongated prisms on the light input surface being made to agree with that of the elongated prisms on the light output surface to show a corresponding positional relationship. With this arrangement, light emitted from the light emitting surface of the light guide with a distribution pattern limited to an appropriate angular range and having a peak in a direction inclined relative to the light emitting surface is made to enter the prism sheet by way of one of the prism faces of the light input surface, and internally reflected by the other prism face. Then, it is subjected to the refraction effect of the elongated prism at the light output surface so that it can be emitted intensively in a required direction with a relatively narrow emission range.

However, while the light source device can intensively emit light with a narrow angular range, it requires the use of a prism sheet that operates as light deflector and on each of the opposite surfaces of which, a plurality of elongated prisms are arranged in such a way that the direction of the elongated prisms on the light input surface is made to agree with that of the elongated prisms on the light output surface to show a corresponding positional relationship. The process of molding such a prism sheet is a complex one.

In JP(A)-10-254371, improvement in luminance in the direction of the normal is intended by defining the angle of inclination $\alpha$ on one of the prism faces of the elongated prisms are set to be 4.7 to 5.7 degrees, and the angle of inclination $\beta$ on the other prism face to be 34.2 to 35 degrees. However, since the other prism face is defined to be planar, sufficient effect has not been obtained.

JP(A)-9-507584 (corresponding to International Publication WO94/20871) and JP(A)-9-105804 disclose a prism sheet having a convex or concave surface formed as one of the prism faces of the elongated prism. JP(A)-2002-197908 discloses a prism sheet having a plurality of planar surfaces or a single convex curved surface formed as one of the prism faces of the elongated prism. However, none of the above cited patent documents describe an improvement in a light source device using a prism sheet by defining a special relationship between the angle of inclination of one of the prism faces of the elongated prism and the angle of inclination of the other prism face.

DISCLOSURE OF THE INVENTION

It is therefore an object of the present invention to provide a light deflector and a light source device in which the distribution of emitted light is controlled to a very narrow range to make it possible to improve the efficiency of utilization of light of the primary light source (or the efficiency of intensively directing light emitted from the primary light source to a given viewing direction) and which have a simplified configuration but can improve the image quality.

According to the present invention, the above object is achieved by providing a light deflector having a light input surface for receiving incident light and a light output surface for emitting incident light, the light output surface being located on the opposite side to the light input surface, the light input surface having a plurality of elongated prisms arranged in parallel to each other, each having two prism faces, characterized in that at least one of the two prism faces is a non-single planar surface, and a vertex split angle $\alpha$ of one of the prism faces which form each of the elongated prisms is 2 to 25 degrees while a vertex split angle $\beta$ of the other of the prism faces is 33 to 40 degrees, a difference ($|\alpha-\beta|$) between the vertex split angle $\alpha$ and the vertex split angle $\beta$ being 8 to 35 degrees. For the purpose of the present invention, a non-single planar surface refers to a surface other than a single planar surface.

According to an aspect of the invention, the vertex split angle $\alpha$ is between 11 and 25 degrees.

According to an aspect of the invention, one of the two prism faces is a non-single planar surface and the other of the prism faces is a single planar surface.

According to an aspect of the invention, the non-single planar surface has at least a convex curved surface.

According to an aspect of the invention, the non-single planar surface has two or more planar surfaces with different inclination angles, two or more convex curved surfaces with different inclination angles, or both one or more planar surfaces and one or more convex curved surfaces. According to an aspect of the invention, in the non-single planar surface, one of the planar surfaces or one of the convex curved surfaces positioned at the side close to the light output surface has larger inclination angle.

According to an aspect of the invention, in the non-single planar surface, a difference between an inclination angle of one of the planar surfaces or one of the convex curved surfaces closest to a vertex of each of the elongated prisms and an inclination angle of the other of the planar surfaces or the other of the convex curved surfaces closest to the light output surface is 1 to 15 degrees. According to an aspect of the invention, a direction of peak in a distribution of light totally reflected by each of the planar surfaces and/or each of the convex curved surfaces of the non-single planar surface and emitted from the light output surface substantially agrees with a normal direction of a plane on which the elongated prisms are formed.

According to an aspect of the invention, a ratio (r/P) of a radius of curvature (r) of each of the convex curved surfaces of the non-single planar surface relative to a pitch (P) of the elongated prisms is 2 to 50. According to an aspect of the invention, a ratio (d/P) of a maximum distance (d) from the non-single planar surface to a virtual plane connecting a vertex and a bottom of each of the elongated prisms to each other relative to a pitch (P) of the elongated prisms is 0.4 to 5%.

According to an aspect of the invention, if a coordinate system is adopted in a cross section of the elongated prisms in which a vertex of each of the elongated prisms is assumed to be an origin of the coordinate system and a length of a pitch P of the elongated prisms is normalized to 1, each of the elongated prisms shows in the cross section thereof a profile formed by connecting in order the adjacent two of sixteen (16) points of point 1 (−0.111, 1.27), point 2 (0.0, 0.0), point 3 (0.159, 0.195), point 4 (0.212, 0.260), point 5 (0.265, 0.328), point 6 (0.319, 0.398), point 7 (0.372, 0.470), point 8 (0.425, 0.544), point 9 (0.478, 0.621), point 10 (0.531, 0.699), point 11 (0.584, 0.780), point 12 (0.637, 0.861), point 13 (0.690, 0.945), point 14 (0.743, 1.030), point 15 (0.796, 1.117) and point 16 (0.889, 1.27) or their neighborhood points to each other.

According to an aspect of the invention, if a coordinate system is adopted in a cross section of the elongated prisms in which a vertex of each of the elongated prisms is assumed to be an origin of the coordinate system and a length of a pitch P of the elongated prisms is normalized to 1, each of the elongated prisms shows in the cross section thereof a profile formed by connecting in order the adjacent two of thirteen (13) points of point 1 (−0.206, 1.168), point 2 (0.000, 0.000), point 3 (0.159, 0.204), point 4 (0.212, 0.273), point 5 (0.265, 0.343), point 6 (0.319, 0.416), point 7 (0.372, 0.490), point 8 (0.425, 0.567), point 9 (0.478, 0.646), point 10 (0.531, 0.727), point 11 (0.584, 0.810), point 12 (0.637, 0.897) and point 13 (0.794, 1.168) or their neighborhood points to each other.

According to an aspect of the invention, if a coordinate system is adopted in a cross section of the elongated prisms in which a vertex of each of the elongated prisms is assumed to be an origin of the coordinate system and a length of a pitch P of the elongated prisms is normalized to 1, each of the elongated prisms shows in the cross section thereof a profile formed by connecting in order the adjacent two of twelve (12) points of point 1 (−0.284, 1.059), point 2 (0.000, 0.000), point 3 (0.212, 0.278), point 4 (0.265, 0.350), point 5 (0.319, 0.423), point 6 (0.372, 0.501), point 7 (0.425, 0.581), point 8 (0.478, 0.663), point 9 (0.531, 0.748), point 10 (0.584, 0.834), point 11 (0.637, 0.922) and point 12 (0.716, 1.059) or their neighborhood points to each other.

According to an aspect of the invention, if the length of the pitch P of the elongated prisms is normalized to 1 in a cross section thereof, each of the elongated prisms shows in the cross section thereof the profile formed with use of the neighborhood points located within a circle of a radius of 0.021 centered at the corresponding points as to at least five points of the sixteen (16), thirteen (13) or twelve (12) points.

According to an aspect of the invention, a pitch P of the elongated prisms and a length L2 of a virtual straight line connecting a vertex and a trough section of each of the elongated prisms to each other in a cross section thereof as to one of the prism faces of the vertex split angle β of each of the elongated prisms shows a relationship of L2/P=1.1 to 1.7. According to an aspect of the invention, a length L1 of a virtual straight line connecting a vertex and a trough section of each of the elongated prisms each other in a cross section thereof as to one of the prism faces of the vertex split angle α of each of the elongated prisms and a length L2 of a virtual straight line connecting a vertex and a trough section of each of the elongated prisms to each other in a cross section thereof as to the other of the prism faces of the vertex split angle β of each of the elongated prisms shows a relationship of L2/L1=1.1 to 1.3.

According to an aspect of the invention, if a length of a pitch P of the elongated prisms is normalized to 1, an edge line formed by the two prism faces of each of the elongated prisms is undulated by 0.018 to 0.354 relative to its base line. According to an aspect of the invention, if a length of a pitch P of the elongated prisms is normalized to 1, the two prism faces of each of the elongated prisms are undulated by 0.012 to 0.334 relative to their respective base planes.

According to an aspect of the invention, a flat section is arranged between the adjacent two of the elongated prisms. According to an aspect of the invention, the flat section is arranged at a position vertically separated from the trough section of each of the elongated prisms by 2 to 10 μm. According to an aspect of the invention, if a length of a pitch P of the elongated prisms is normalized to 1, the flat section is arranged at a position vertically separated from a trough section of each of the elongated prisms by 0.035 to 0.18. According to an aspect of the invention, if a length L2 of a virtual straight line connecting a vertex and a trough section of each of the elongated prisms to each other in a cross section thereof as to one of the prism faces of the vertex split angle β of each of the elongated prisms is normalized to 1, the flat section is arranged at a position vertically separated from the trough section of each of the elongated prisms by 0.022 to 0.16.

According to the present invention, there is provided a light deflector having a light input surface for receiving incident light and a light output surface for emitting incident light, the light output surface being located on the opposite side to the light input surface, the light input surface having a plurality of elongated prisms arranged in parallel to each other, each having two prism faces, characterized in that at least one of the two prism faces is a non-single planar surface, and a vertex split angle α of one of the prism faces which form each of the elongated prisms is 2 to 25 degrees while a vertex split angle β of the other of the prism faces is 33 to 40 degrees, and that, if a length of a pitch P of the elongated prisms is normalized to 1, an edge line formed by the two prism faces of each of the elongated prisms is undulated by 0.018 to 0.354 relative to its base plane.

According to the present invention, there is provided a light deflector having a light input surface for receiving incident light and a light output surface for emitting incident light, the light output surface being located on the opposite side to the light input surface, the light input surface having a plurality of elongated prisms arranged in parallel to each other, each having two prism faces, characterized in that at least one of the two prism faces is a non-single planar surface, and a vertex split angle α of one of the prism faces which form each of the elongated prisms is 2 to 25 degrees while a vertex split angle β of the other of the prism faces is 33 to 40 degrees, and that, if a length of a pitch P of the elongated prisms is normalized to 1, the two prism faces of each of the elongated prisms are undulated by 0.012 to 0.334 relative to their respective base planes.

Further, according to the present invention, there is provided a light source device comprising: a primary light source; a light guide having a light incident surface for receiving light emitted from the primary light source, guiding an incident light and having a light emitting surface for emitting a guided light; and the above light deflector arranged with its light input surface located vis-à-vis the light emitting surface of the light guide.

According to an aspect of the invention, the light deflector is arranged with one of the prism faces of the vertex split angle α of each of the elongated prisms located close to the primary light source and with the other of the prism faces of the vertex split angle β of each of the elongated prisms located remotely from the primary light source.

According to an aspect of the invention, the primary light source is arranged adjacent to a corner section of the light guide and the elongated prisms of the light deflector are arranged substantially concentrically and centered substantially at the primary light source.

According to an aspect of the invention, a light diffuser is arranged adjacent to the light output surface of the light deflector with a full width at half maximum of a distribution of emitted light showing anisotropy when receiving collimated light.

BRIEF DESCRIPTION OF THE DRAWINGS

FIG. 11 is a schematic illustration of the distribution of light emitted from a light deflector;

FIG. 12 is a schematic illustration of the distribution of light emitted from a light deflector;

FIG. 19 is a schematic illustration of the full width at half maximum of the distribution of emitted light;

BEST MODE FOR CARRYING OUT THE INVENTION

Now, the present invention will be described by referring to the accompanying drawings that illustrate preferred embodiments of the invention.

Figure 1:
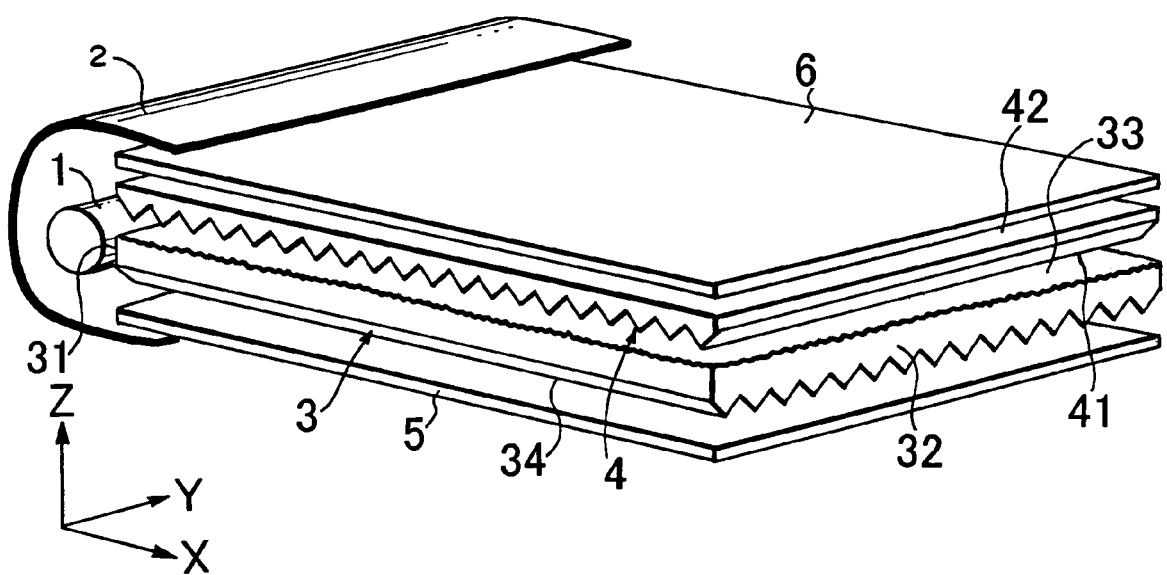
FIG. 1 is a schematic perspective view of a light source device according to the invention.

FIG. 1 is a schematic perspective view of an embodiment of a planar light source device according to the invention. Referring to FIG. 1, the embodiment of planar light source device comprises a light guide 3 in which at least one lateral end face thereof functions as a light incident surface 31 and a surface thereof substantially orthogonal relative to the lateral end face functions as a light emitting surface 33, a linear or rod-shaped primary light source 1 arranged vis-à-vis the light incident surface 31 of the light guide 3 and covered by a light source reflector 2, a light deflector 4 arranged on the light emitting surface 33 of the light guide 3, a light diffuser 6 arranged on the light deflector 4 and a light reflector 5 arranged facing a rear surface 34 of the light guide 3, the rear surface 34 being located on the opposite side to the light emitting surface 33.

The light guide 3 is arranged in parallel with the XY plane and shows a rectangular plate-like profile as a whole. The light guide 3 has four lateral end faces. At least one of the pair of the lateral end faces that run in parallel with the YZ plane operates as the light incident surface 31. The light incident surface 31 is arranged vis-à-vis the primary light source 1 so that light emitted from the primary light source 1 enters the light guide 3 through the light incident surface 31. For the purpose of the present invention, another primary light source may be arranged vis-à-vis another lateral end face of the light guide 3 such as the lateral end face 32 opposite to the light incident surface 31.

The two principle surfaces of the light guide 3 that are substantially orthogonal relative to the light incident surface 31 are arranged substantially in parallel with the XY plane and one of the two principal surfaces (the upper surface in FIG. 1) operates as the light emitting surface 33. A directional light emitting functional structure is formed by a coarse or roughened surface or a lens surface where a large number of elongated lenses such as elongated prisms, elongated lenticular lenses or V-shaped grooves are arranged in parallel to each other and substantially in parallel with the light incident surface 31 on at least one of the light emitting surface 33 and the rear surface 34 located opposite thereto so that light entering the light guide 3 through the light incident surface 31 is guided through the light guide 3 and emitted from the light emitting surface 33 as directional light in terms of the distribution of emitted light in a plane (XZ plane) orthogonal relative to the light incident surface 31 and the light emitting surface 33. The direction of the peak of the distribution of emitted light in the XZ plane forms an angle of "a" with the light emitting surface 33. The angle $\underline{a}$ is preferably 10 to 40 degrees and a full width at half maximum of the distribution of emitted light is preferably 10 to 40 degrees.

The coarse surface or the elongated lenses formed on at least one of the principal surfaces of the light guide 3 may show an average angle of inclination or average inclination angle θa according to ISO4287/1-1984 that is found within a range between 0.5 and 15 degrees, preferably between 1 to 12 degrees, more preferably between 1.5 and 11 degrees, from the viewpoint of uniform distribution of luminance in the light emitting surface 33. Preferably, an optimal range is defined for the average angle of inclination θa in terms of the ratio (L/t) of the thickness (t) of the light guide 3 and the length (L) in the direction along which incident light is transmitted. More specifically, when a light guide 3 showing a ratio (L/t) that is greater than 20 but not greater than 200 is used, the average angle of inclination θa is preferably 0.5 to 7.5 degrees, more preferably 1 to 5 degrees, and further preferably 1.5 to 4 degrees, and when a light guide 3 showing a ratio (L/t) that is not greater than 20 is used, the average angle of inclination θa is preferably 7 to 12 degrees, more preferably 8 to 11 degrees.

According to ISO 4287/1-1984, the average angle of inclination θa of the coarse surface that is formed on the light guide 3 is determined by observing the profile of the coarse surface by means of a contact profile meter, defining the coordinate in the measuring direction as x to obtain a function of inclination f(x) and using formula (1) and formula (2) shown below on the basis of the function of inclination f(x).

$$\Delta a = (1/L) \int_0^L |(d/dx)f(x)| dx \qquad (1)$$

$$\theta a = \tan^{-1}(\Delta a) \qquad (2)$$

Preferably, the light emitting ratio of the light guide 3 is in a range between 0.5 and 5%, more preferably between 1 and 3%. This is because the quantity of light emitted from the light guide 3 is too small and it may not possible to obtain a sufficient luminance when the light emitting ratio falls under 0.5%, whereas light is emitted in large quantity near the primary light source 1 and attenuates remarkably along the X-direction in the light emitting surface 33 so that the uniformity of luminance on the light emitting surface 33 may be degraded when the light emitting ratio exceeds 5%. Thus, it is possible to make the light guide 3 emit highly directional light with such emission characteristics that the angle of peak light (peak angle) in the distribution of light emitted from the light emitting surface is found within a range between 50 and 80 degrees relative to the normal to the light emitting surface and the full width at half maximum of the distribution of emitted light in the XZ plane that is orthogonal relative to both the light incident surface and the light emitting surface is between 10 and 40 degrees when the light emitting ratio of the light guide 3 is found within a range between 0.5 and 5%. Then, the light emitting direction can be efficiently deflected by means of the light deflector 4 to consequently provide a planar light source device with an enhanced degree of luminance.

For the purpose of the present invention, the light emitting ratio from the light guide 3 is defined as follows. If the thickness (the dimension in the Z-direction) of the light guide 3 is t, the relationship between the intensity of emitted light ($I_0$) at the edge of the light emitting surface 33 located at the side of the light incident surface 31 and the intensity of emitted light (I) at a position separated from the edge located at the side of the light incident surface 31 by distance L is expressed by formula (3) shown below.

$$I = I_0 \cdot A(1-A)^{L/t} \qquad (3)$$

The constant A in the above formula is the light emitting ratio (%), which is the quantity of light emitted per unit length (that corresponds to the thickness t of the light guide) of the light emitting surface 33 in the X-direction that is orthogonal relative to the light incident surface 31. The light emitting ratio A can be obtained by plotting the relationship between the intensity of light emitted from the light emitting surface 23 and the ratio of (L/t) on a graph where the ordinate represents the logarithmic value of the intensity of light emitted from the light emitting surface and the abscissa represents the ratio of (L/t), and determining the gradient of the graph.

Preferably, a lens surface is formed at the other principal surface where the directional light emitting functional structure is not formed by arranging a large number of elongated lenses that extend substantially in a direction (X-direction) perpendicular to the light incident surface 31 in order to control the directivity of light emitted from the light guide 3 in a plane (YZ plane) running in parallel with the primary light source 1. In the case of the embodiment illustrated in FIG. 1, a coarse surface is formed on the light emitting surface 33 and a lens surface is formed by arranging a large number of elongated lenses extending substantially in a direction (X-direction) perpendicular to the light incident surface 31 on the rear surface 34. However, for the purpose of the present invention, conversely relative to the arrangement of FIG. 1, a lens surface may be formed on the light emitting surface 33 and a coarse surface may be formed on the rear surface 34.

When elongated lenses are formed on the rear surface 34 or the light emitting surface 33 of the light guide 3 as shown in FIG. 1, the elongated lenses may typically be elongated prisms, lenticular lenses or V-shaped grooves extending substantially in the X-direction. Preferably, however, the elongated lenses are elongated prisms that show a substantially triangular cross section when taken along the YZ plane.

When forming elongated prisms, the vertex angle is preferably within a range between 70 and 150 degrees. This is because light emitted from the light guide 3 can be converged sufficiently to satisfactorily improve the luminance of the planar light source device when the vertex angle is found within this range. More specifically, it is possible to make the planar light source device emit converged light showing a full width at half maximum of the distribution of emitted light equal to 35 to 65 degrees in a plane containing peak light and perpendicular to the XZ plane and consequently improve the luminance of the planar light source device when the vertex angle of the prisms is found within this range. When elongated prisms are formed on the light emitting surface 33, the vertex angle is preferably between 80 and 100 degrees. When, on the other hand, elongated prisms are formed on the rear surface 34, the vertex angle is preferably between 70 and 80 degrees or between 100 and 150 degrees.

A light source device according to the invention may be provided with a directional light emitting function by mixing and dispersing light diffusing fine particles into the inside of the light guide in place of or in addition to the directional light emitting functional structure formed on the light emitting surface 33 or the rear surface 34 as described above. The cross section of the light guide 3 is not limited to the one illustrated in FIG. 1. Alternatively, it may show a wedge-shaped or boat-shaped cross section.

Figure 2:
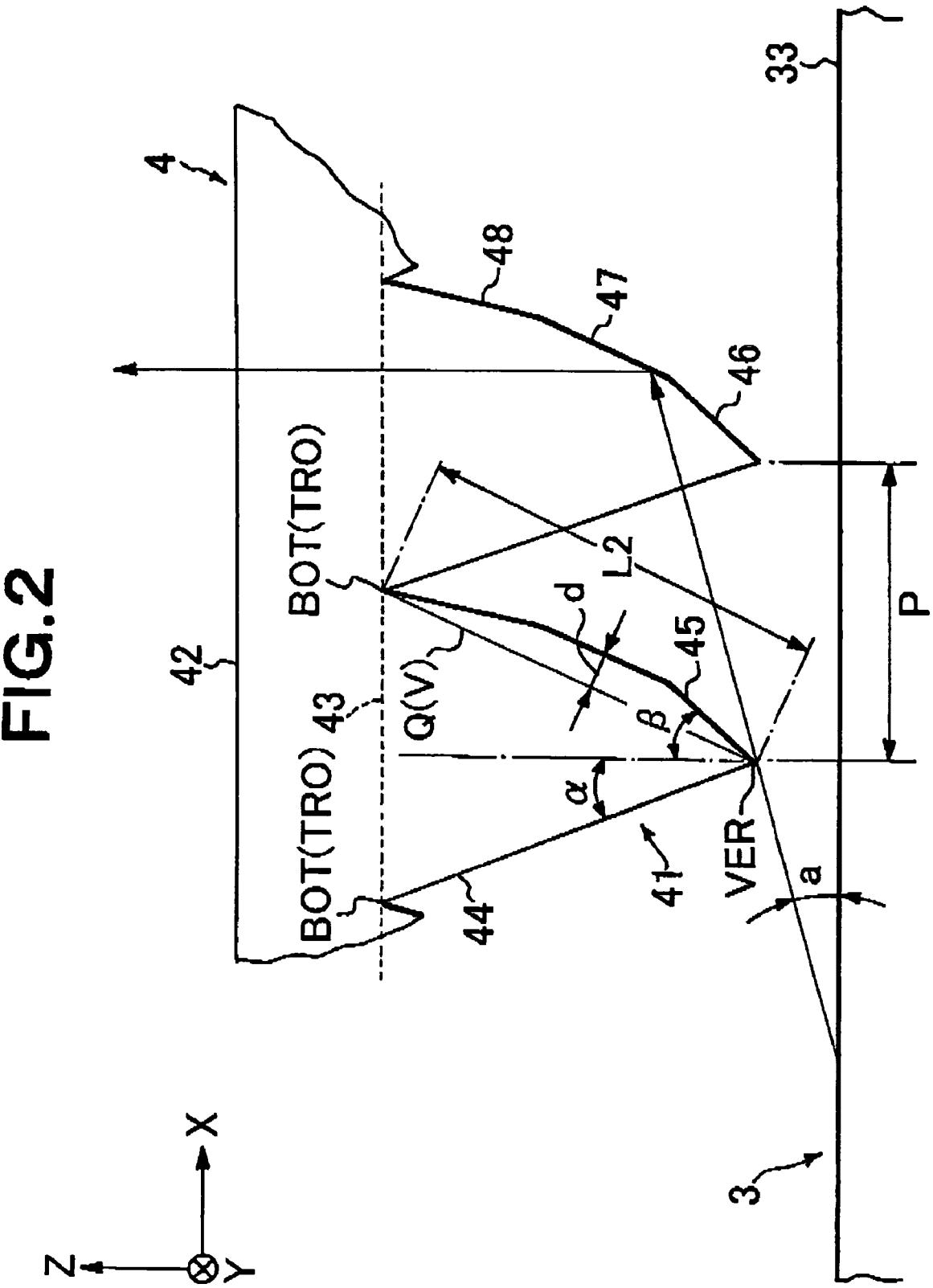
FIG. 2 is a schematic illustration of a couple of elongated prisms of a light deflector according to the invention that are arranged at an light input surface thereof, showing their profiles.
Figure 3:
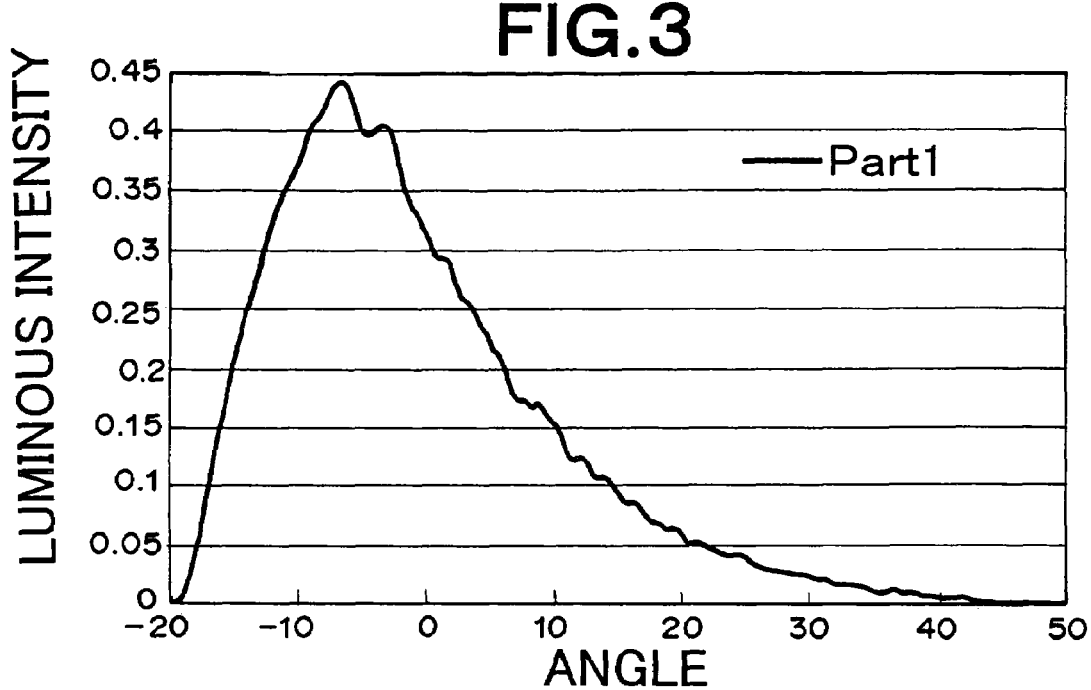
FIG. 3 is a schematic illustration of the distribution of light emitted from a light deflector.
Figure 4:
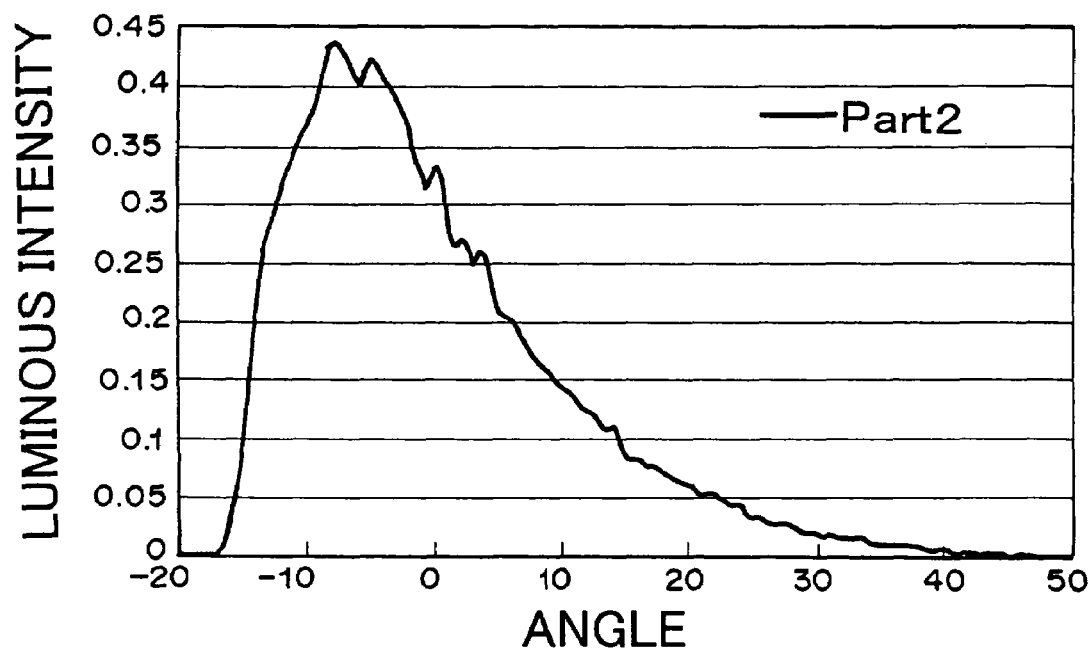
FIG. 4 is a schematic illustration of the distribution of light emitted from a light deflector.
Figure 5:
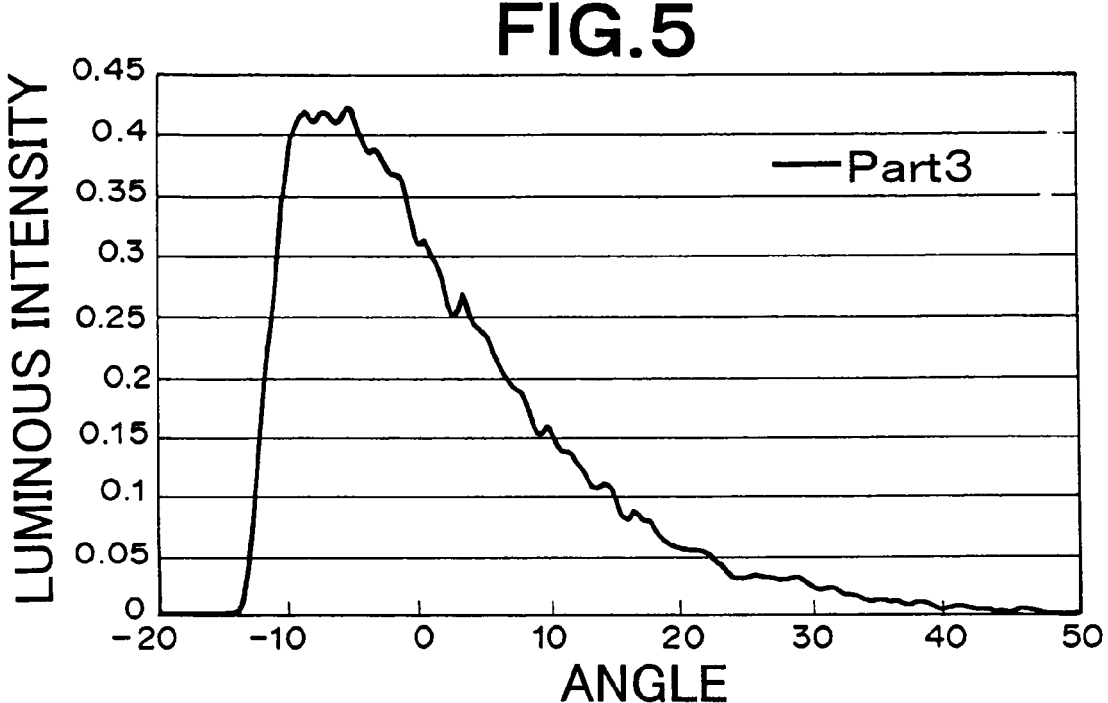
FIG. 5 is a schematic illustration of the distribution of light emitted from a light deflector.
Figure 6:
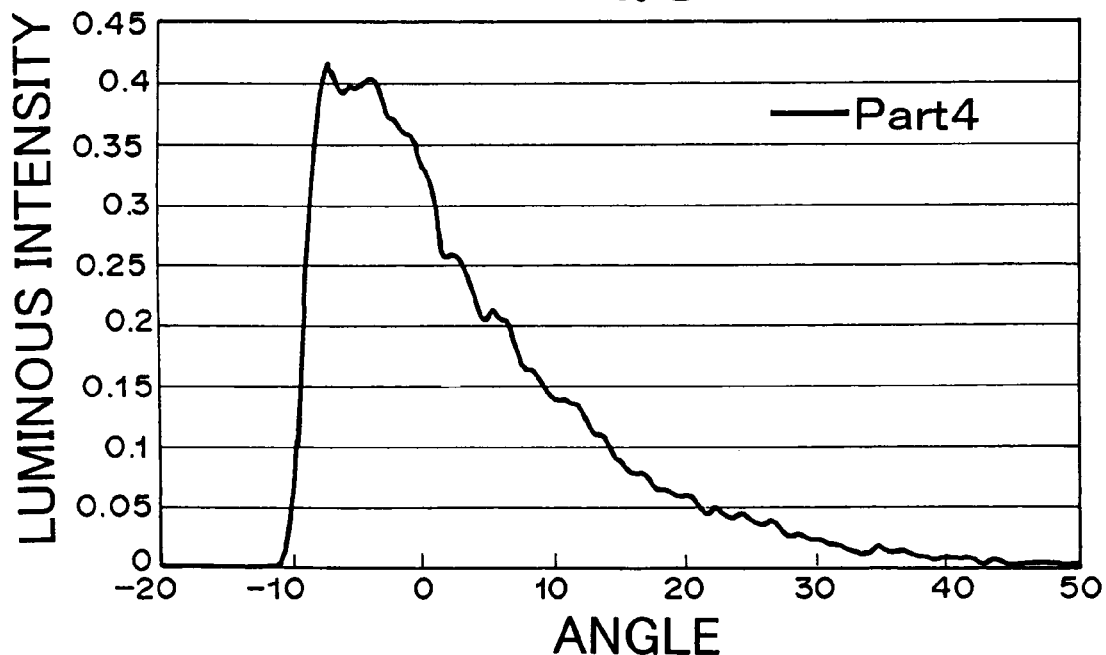
FIG. 6 is a schematic illustration of the distribution of light emitted from a light deflector.
Figure 7:
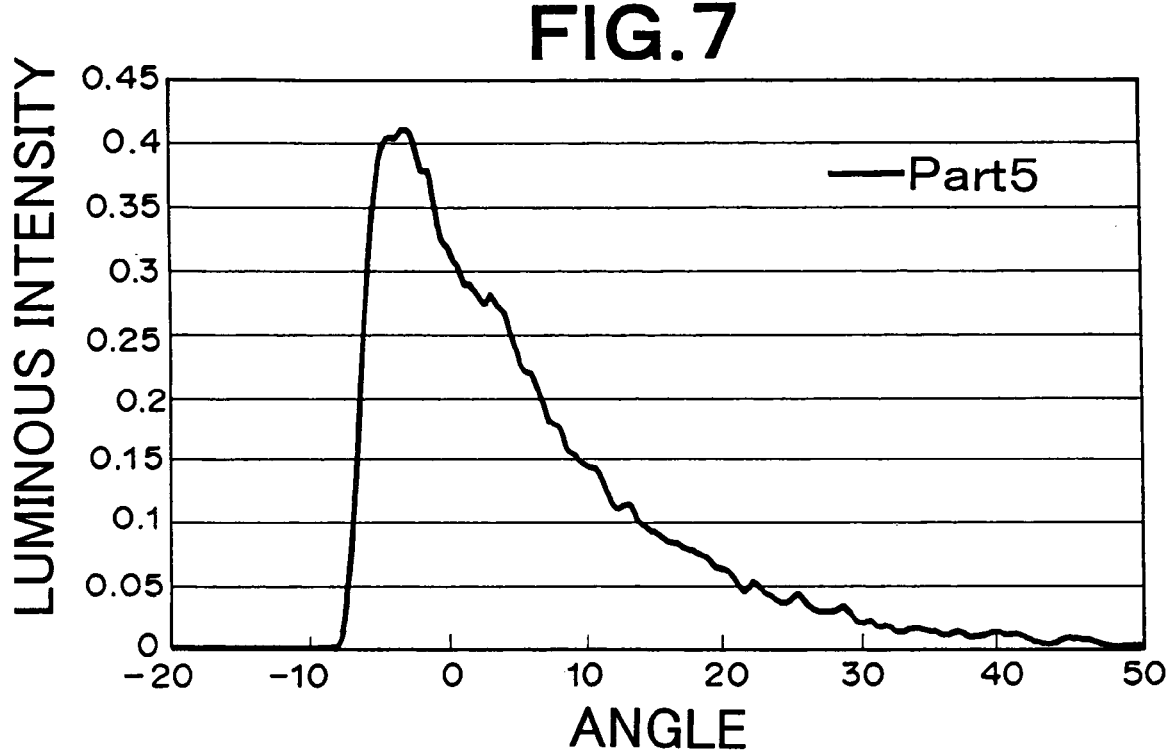
FIG. 7 is a schematic illustration of the distribution of light emitted from a light deflector.
Figure 8:
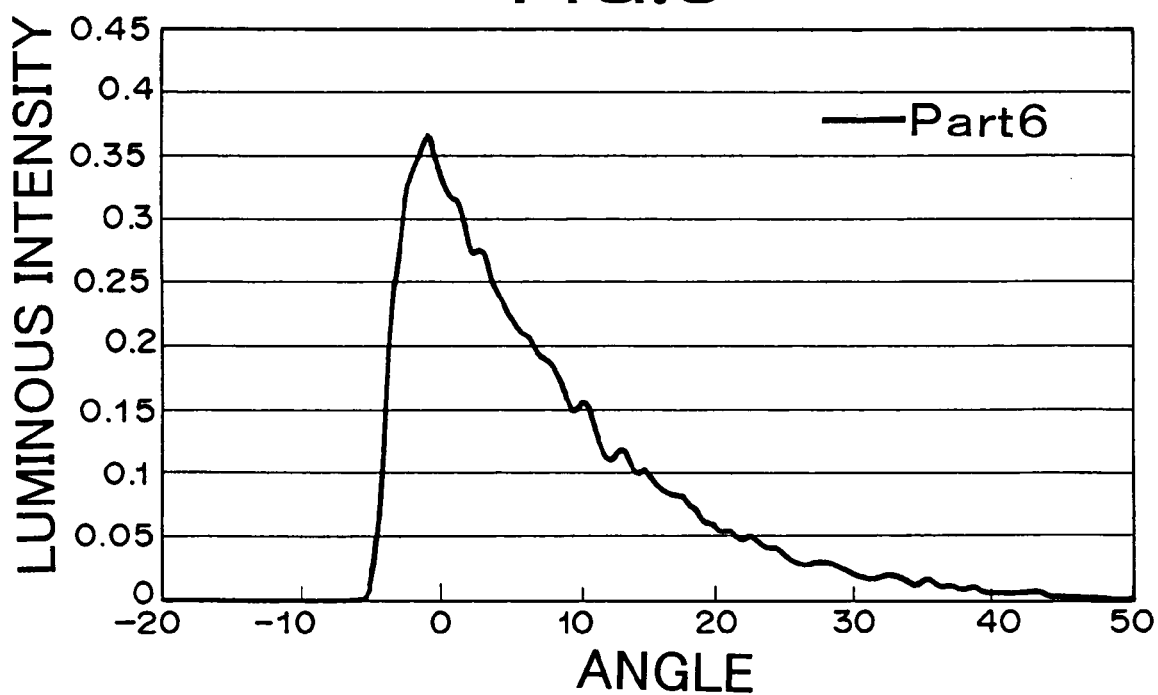
FIG. 8 is a schematic illustration of the distribution of light emitted from a light deflector.
Figure 9:
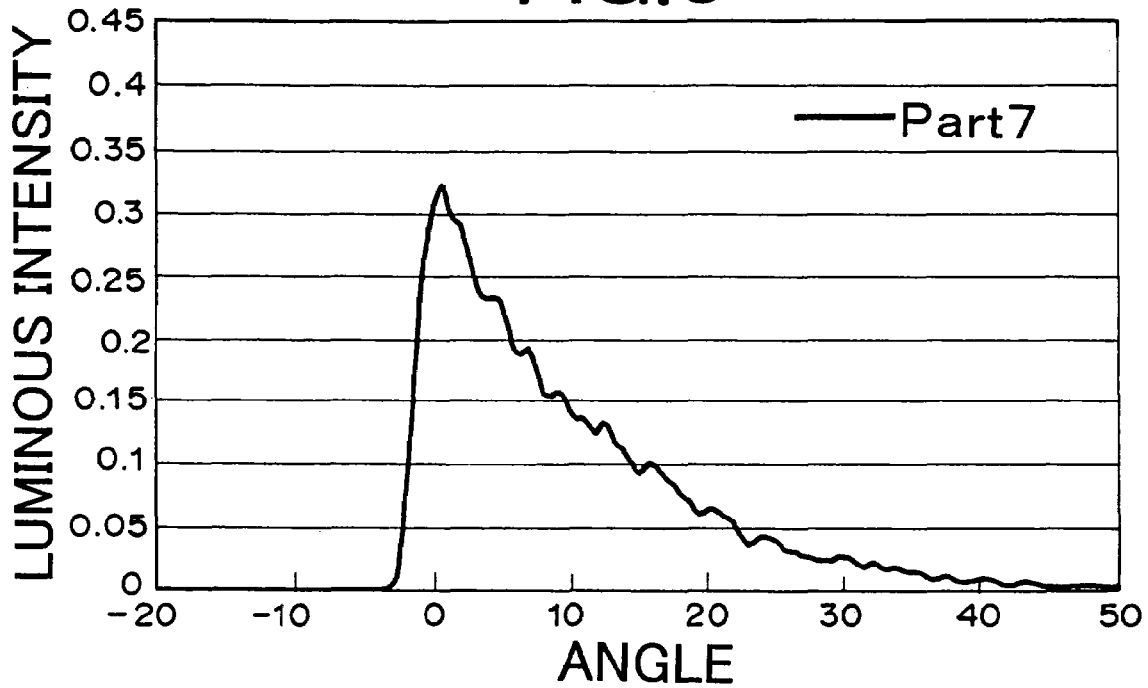
FIG. 9 is a schematic illustration of the distribution of light emitted from a light deflector.
Figure 10:
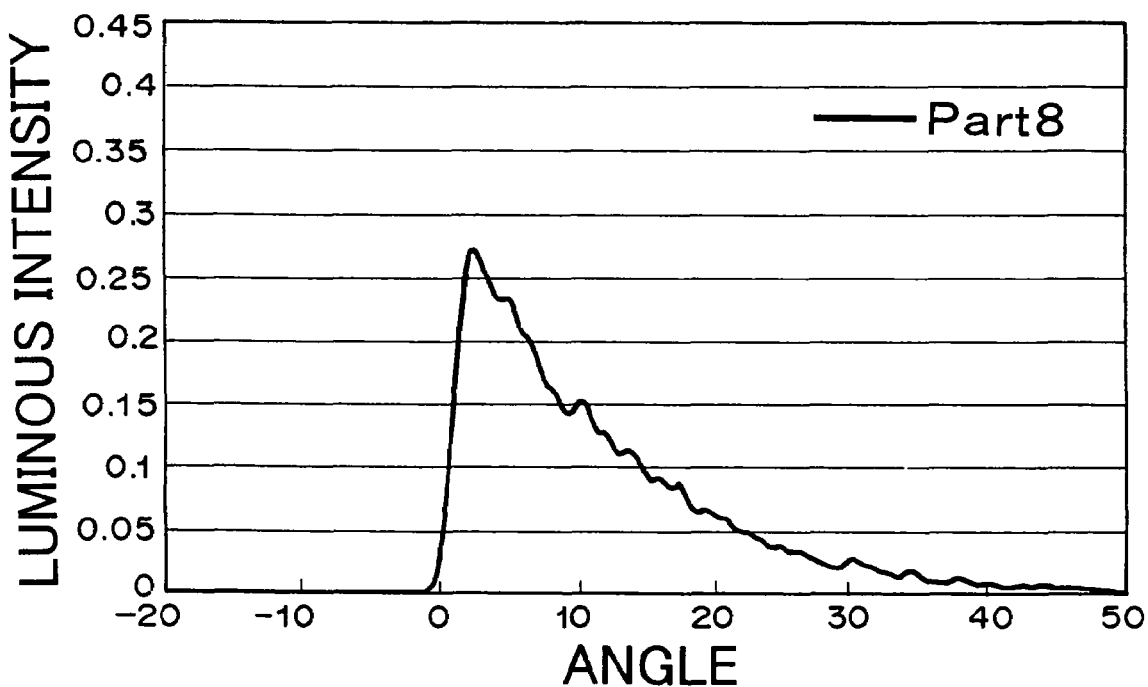
FIG. 10 is a schematic illustration of the distribution of light emitted from a light deflector.

FIG. 2 is a schematic illustration of a couple of elongated prisms of the light deflector 4, showing their profiles. The light deflector 4 has one of its principal surfaces operating as a light input surface 41 and the other of the principal surfaces operating as a light output surface 42. A large number of elongated prisms are arranged in parallel to each other on the light input surface 41 and each of the elongated prisms has two prism faces including a first prism face 44 located close relative to the light source and a second prism face 45 located remote relative to the light source. In the case of the embodiment of FIG. 2, the first prism face 44 is a single planar surface and the second prism face 45 is a non-single planar surface that includes three planar surfaces 46 through 48 having respective angles of inclination that are different from each other. The closer to the light output surface 42, the greater the angle of inclination for the three planar surfaces of the non-single planar surface. For the purpose of the present invention, the angle of inclination of a surface or face of an elongated prism refers to the angle of inclination of the surface or face relative to an elongated prism forming plane 43.

The light deflector 4 can produce a high light converging effect and to consequently provide a light source device with an enhanced degree of luminance when a vertex split angle α of the first prism face 44 is 2 to 25 degrees and a vertex split angle β of the second prism face 45 is 33 to 40 degrees, an absolute value of the difference between α and β ($|\alpha-\beta|$) being 8 to 35 degrees. For the purpose of the present invention, the vertex split angles α,β denote respectively the left and right split angles of the vertex angle of each of the elongated prisms relative to the direction of the normal of the elongated prism forming plane 43, the angle between the first prism face 44 and the normal of the elongated prism forming plane 43 at the vertex (VER) of the elongated prism being referred to as α, the angle between the second prism face 45 and the normal of the elongated prism forming plane 43 at the vertex of the elongated prism being referred to as β. Additionally, it is possible to achieve a very high luminance by arranging two or more surfaces for the prism face in such a way that closer to the light output surface 42, greater the angle of inclination for the surfaces and making the peak angles of lights totally reflected by the respective surfaces and emitted from the light output surface 42 agree with each other for all the surfaces. At this time, the difference between the angle of inclination of the surface located closest to the light output surface and the angle of inclination of the surface located remotest from the light output surface is found within a range between 1 and 15 degrees, preferably between 5 and 12 degrees, more preferably between 7 and 10 degrees. It is possible to design a light deflector showing desired light converging characteristics with ease and manufacture a light deflector showing given optical characteristics on a stable basis by making the second prism face 45 show such a configuration.

Figure 13:
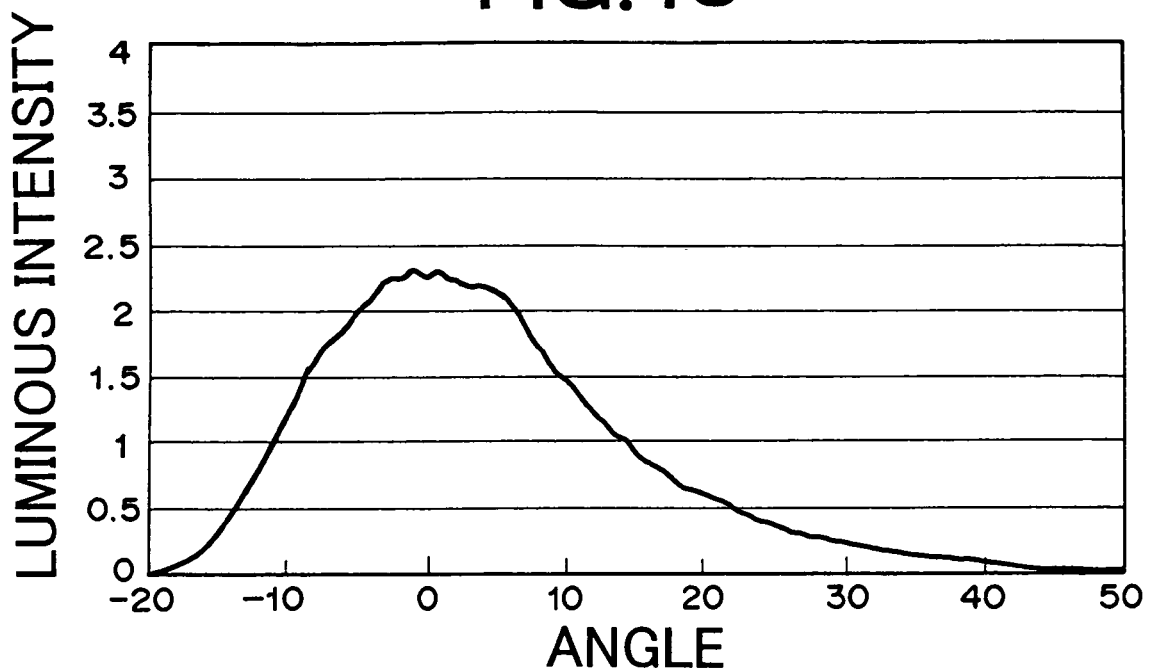
FIG. 13 is a schematic illustration of the distribution of light emitted from a light deflector.

Now, the profile and the function of each of the prism faces of the light deflector according to the invention will be described below in greater detail. FIGS. 3 through 12 are schematic illustrations of the distribution of light which has a peak angle in the distribution of light emitted from the light guide being 20 degrees relative to the light emitting surface, emitted from a known light deflector having two prism faces, both of which are single planar surfaces and arranged symmetrically relative to the direction of the normal to the light output surface with respective angles α and β (which correspond to vertex split angles α and β as defined earlier for the purpose of the present invention), the prism vertex angle being 65.4 degrees (α=β=32.7 degrees), along a plane perpendicular to both the light incident surface and the light emitting surface of the light guide. More specifically, the second prism face is divided into equal 10 areas in the x-direction and FIGS. 3 through 12 illustrate the distributions of emitted light from the respective areas when light enters the light deflector through the first prism face and is totally reflected by the second prism face and emitted from the light output surface 42. The ten areas are referred to as Part 1, Part 2, ..., Part 10 from the one located closest to the vertex of the elongated prism. As for the distribution of all the emitted light after being totally reflected by the second prism face, peak light is emitted in the direction of the normal relative to the elongated prism forming plane and shows a full width at half maximum of 22 degrees as shown in FIG. 13.

However, as for the distribution of each of the areas of Part 1 through Part 10, the angle of peak light of Part 1 and that of Part 2 are about −9 degrees (a negative angle indicates that it is inclined toward the light source, the direction of the normal being referred to as angle of 0 degree). Then, the angles of peak light of Part 3 through Part 7 are gradually and sequentially shifted toward the direction of 0 degree and those of Part 8 through Part 10 are then gradually and sequentially shifted further from 0 degree to show positive angles. The angle of peak light totally reflected by the area (Part 10) located closest to the light output surface 42 and emitted is 7 degrees. Thus, the angles of peak light of the ten areas of the second prism face (Part 1 through Part 10) are spread within 16 degrees. The intensities of peak light of the ten areas gradually falls from Part 1 to Part 10.

Figure 14:
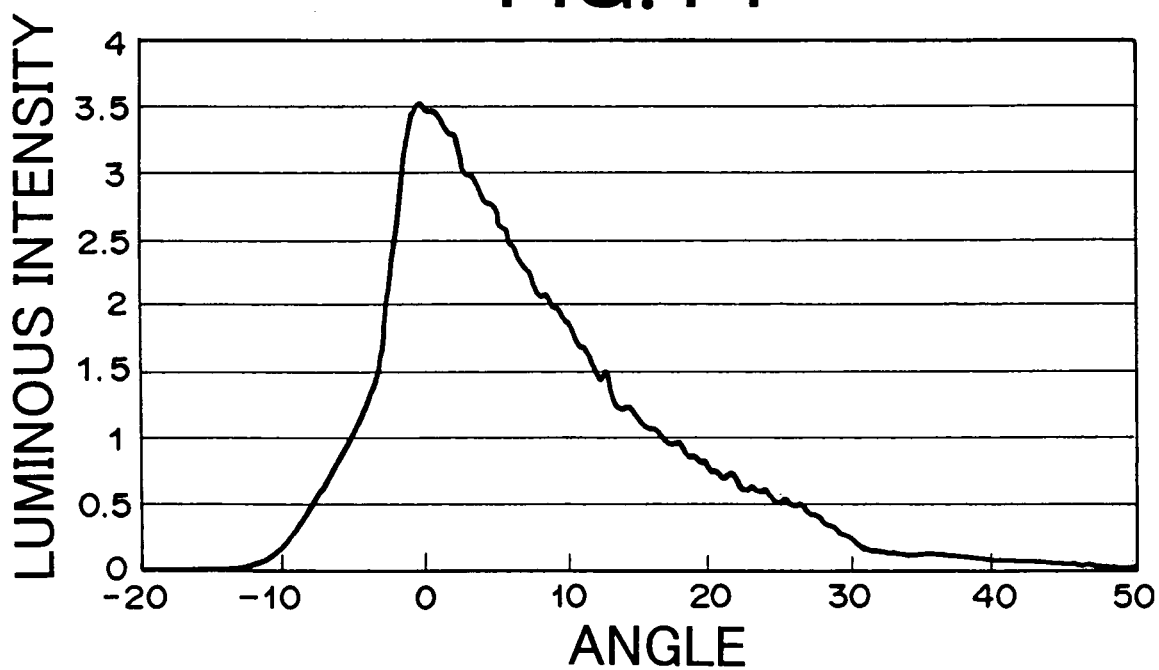
FIG. 14 is a schematic illustration of the distribution of light emitted from a light deflector.

Thus, it will be seen that light totally reflected by a prism face that is a single planar surface and emitted is distributed over a wide range as a function of the areas of the prism face that totally reflect the light. Then, it is possible to make emitted light converge mostly toward a specific direction by adjusting the angles of inclination of the surfaces of the areas to thereby emit the respective peak light in the distribution of light totally reflected by each of the areas so that the angles of the peak lights in the distribution of emitted light show substantially the same direction for all the areas. The angles of inclination of the surfaces of the areas are made to show a monotonous increase from Part 1 to Part 10. In other words, the angle of inclination of the surface of the area closer to the light output surface 42 is made greater. Thus, it is possible to make light totally reflected by the entire prism face and emitted converge toward a given direction as shown in FIG. 14 by adjusting the angles of inclination of the surface of the areas so as to make the light deflector emit highly directional light with a high peak intensity. The present invention is based on this idea.

Figure 15:
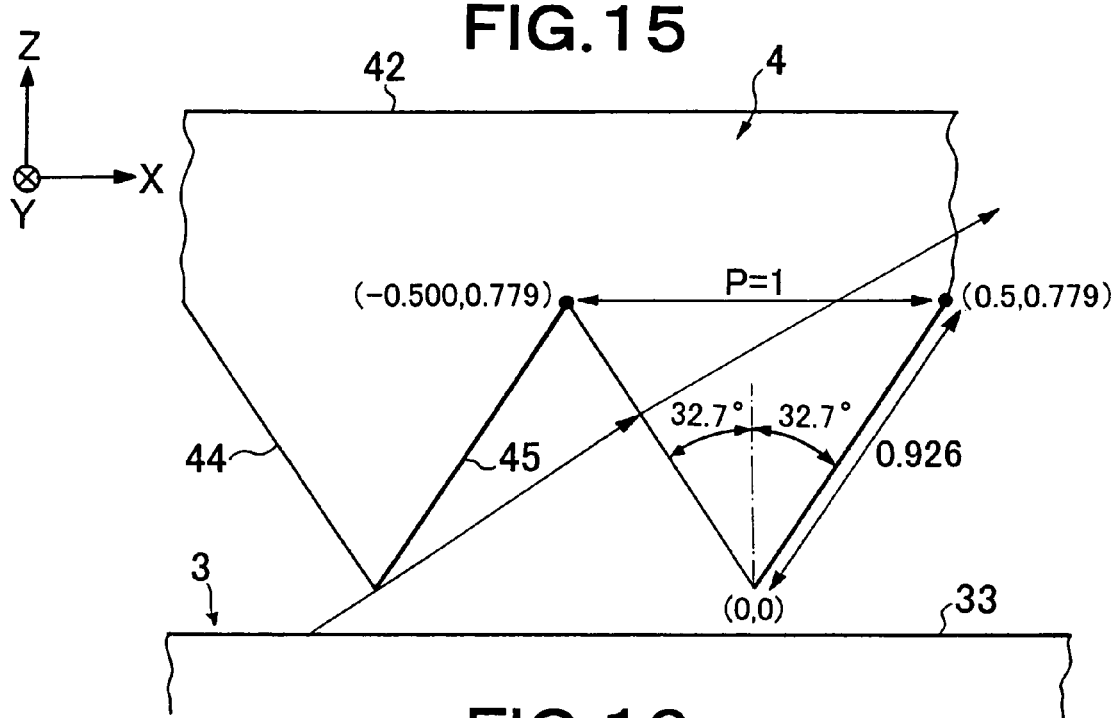
FIG. 15 is a schematic illustration of refraction of light and length of a prism face in cross section of an elongated prism that can vary depending on the angle of inclination of the prism face.
Figure 16:
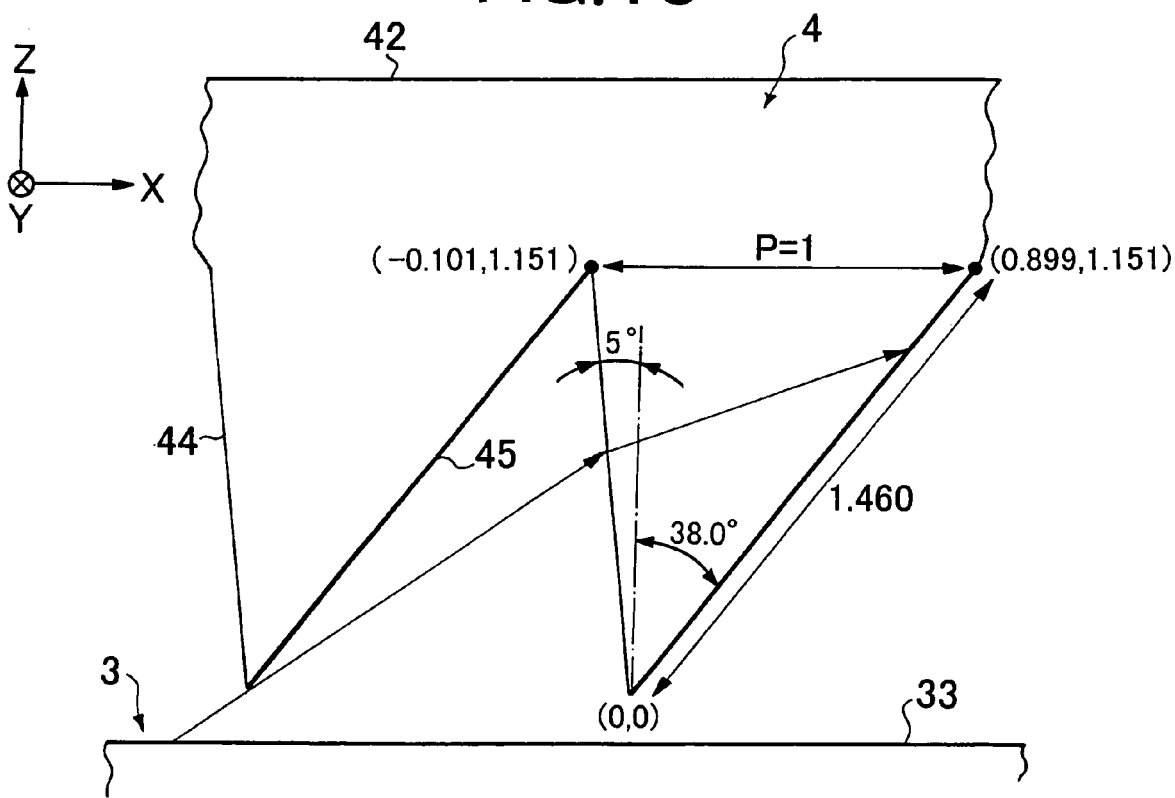
FIG. 16 is another schematic illustration of refraction of light and length of a prism face in cross section of an elongated prism that can vary depending on the angle of inclination of the prism face.

However, when the vertex split angle α of the first prism face 44 is α=32.7 degrees, the quantity of light that the second prism face 45 receives is not large and hence the peak intensity is limited if efforts are paid to raise it. On the other hand, the quantity of light that the second prism face 45 receives can be increased and hence the peak intensity is raised when a value between 2 and 25 degrees is selected for the vertex split angle α. This is because the refraction effect of the first prism face 44 is boosted and additionally the second prism face 45 is made to show a long cross section by dimensionally adjusting the second prism face 45 so as to arrange the elongated prisms at the same and identical pitch as may be seen by comparing FIGS. 15 and 16. For example, when α and β are made to be equal to 5 degrees and 38 degrees respectively as shown in FIG. 16, the quantity of light that the second prism face 45 receives is about 1.29 times greater than the quantity of light that the second prism face 45 receives when α=β=32.7 degrees as shown in FIG. 15. Thus, the quantity of light that the second prism face 45 receives is increased by decreasing the value of α. However, it is not possible to efficiently direct totally reflected light substantially in the direction of the normal when the second prism face 45 is a single plane. In other words, it is necessary to form the second prism face 45 by a non-planar surface, e.g., a curved surface, and/or by a number of surfaces, e.g., planar surfaces.

As for the number of areas of the second prism face 45, the angles of peak light can be finely adjusted over the entire prism face to consequently increase the extent of convergence of emitted light as a whole when the a large number of areas are provided. Then, however, it is necessary to finely form planar surfaces with different angles of inclination to thereby make the operation of designing cutting tools for cutting metal molds to be used for forming the prism face of the light deflector and that of manufacturing such cutting tools very complex ones, and additionally it is difficult to prepare light deflectors showing predetermined optical characteristics on a stable basis. Therefore, the number of areas to be formed on a prism face is preferably limited to a range between 3 and 20, more preferably to a range between 4 and 15. While it is preferable to divide the prism face uniformly into areas, it is not necessary to uniformly divide the prism face into areas. In other words, the areas may be adjusted depending on the desired distribution of light emitted for the entire prism face.

The value of α is between 2 and 25 degrees, preferably between 5 and 25 degrees, specifically between 11 and 25 degrees, more preferably between 11 and 20 degrees, most preferably between 12 and 15 degrees. The value of β is between 33 and 40 degrees, preferably between 33.5 and 39.5 degrees, more preferably between 33.5 and 38 degrees, most preferably between 34 and 38 degrees. The absolute value of the difference between α and β (|α−β|) is between 8 and 35 degrees, preferably between 8 and 34.5 degrees, more preferably between 13 and 27 degrees, most preferably between 19 and 23 degrees. While the peak intensity is raised when the value of a is small, it is difficult to direct the angles of peak light substantially toward the direction of the normal when α=0. Additionally, when the value of α is small, the vertex angle (α+β) of the prism has to be made small in order to direct the angles of peak light substantially toward the direction of the normal. Then, it is difficult to manufacture such a light deflector and particularly optical defects such as scars and burrs can easily be produced on the elongated prisms when the latter are molded. Taking these into consideration, it is most preferable to make the value of α not smaller than 5 degrees and also make the elongated prism show such a cross section that causes the angle of peak light in the distribution of emitted light for each area is substantially directed toward the direction of the normal. On the other hand, the convergent effect of light tends to be insufficient when the value of α is too large. Additionally, when the absolute value of the difference between α and β (|α−β|) is too small, α consequently shows a large value to make the convergent effect of light tends to be insufficient. When, on the other hand, the absolute value is too large, α consequently shows a small value and optical defects can easily be produced on the elongated prisms when the latter are molded.

Figure 21:
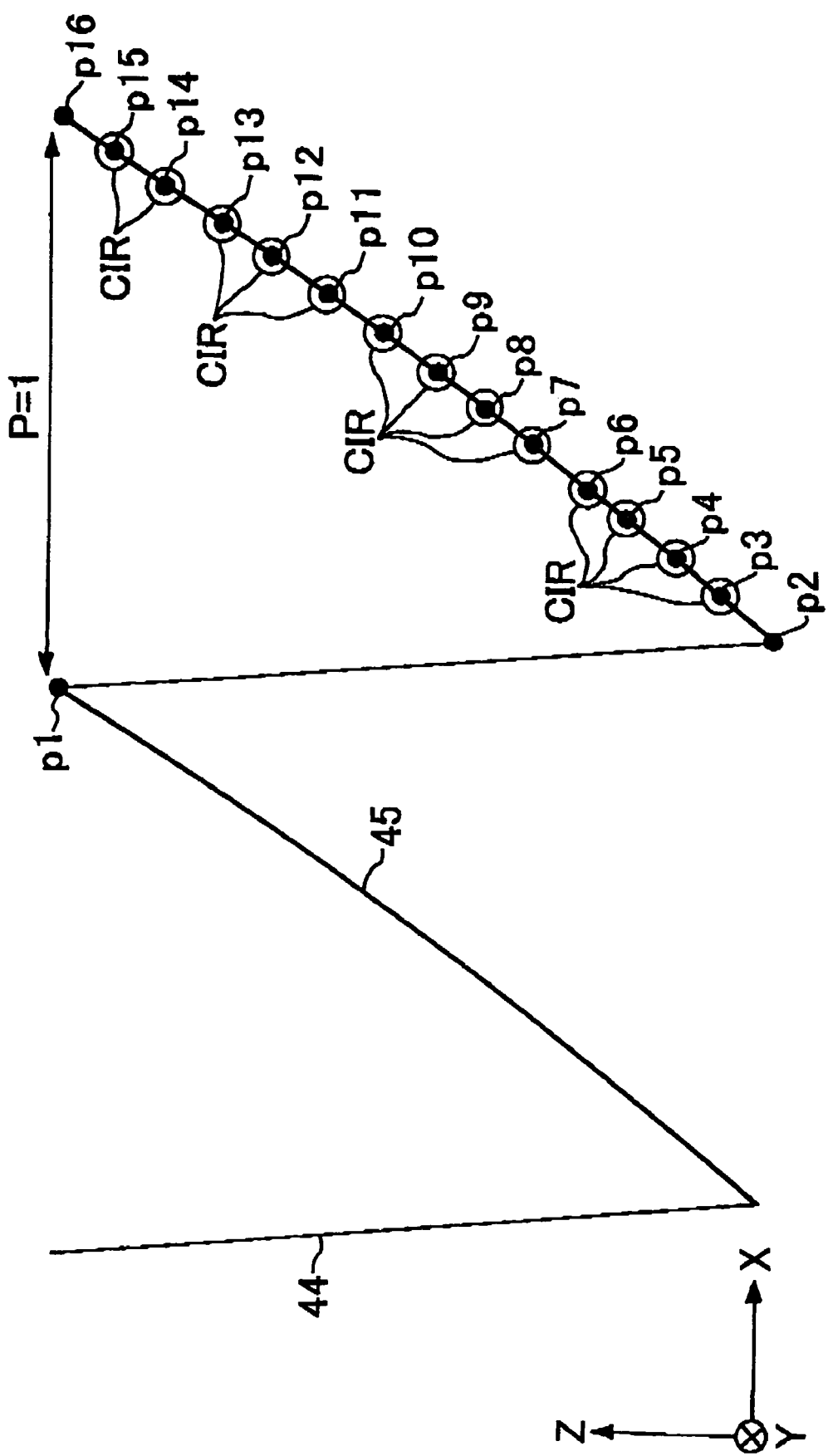
FIG. 21 is a schematic illustration of a profile formed by connecting in order the adjacent two of sixteen points.
Figure 22:
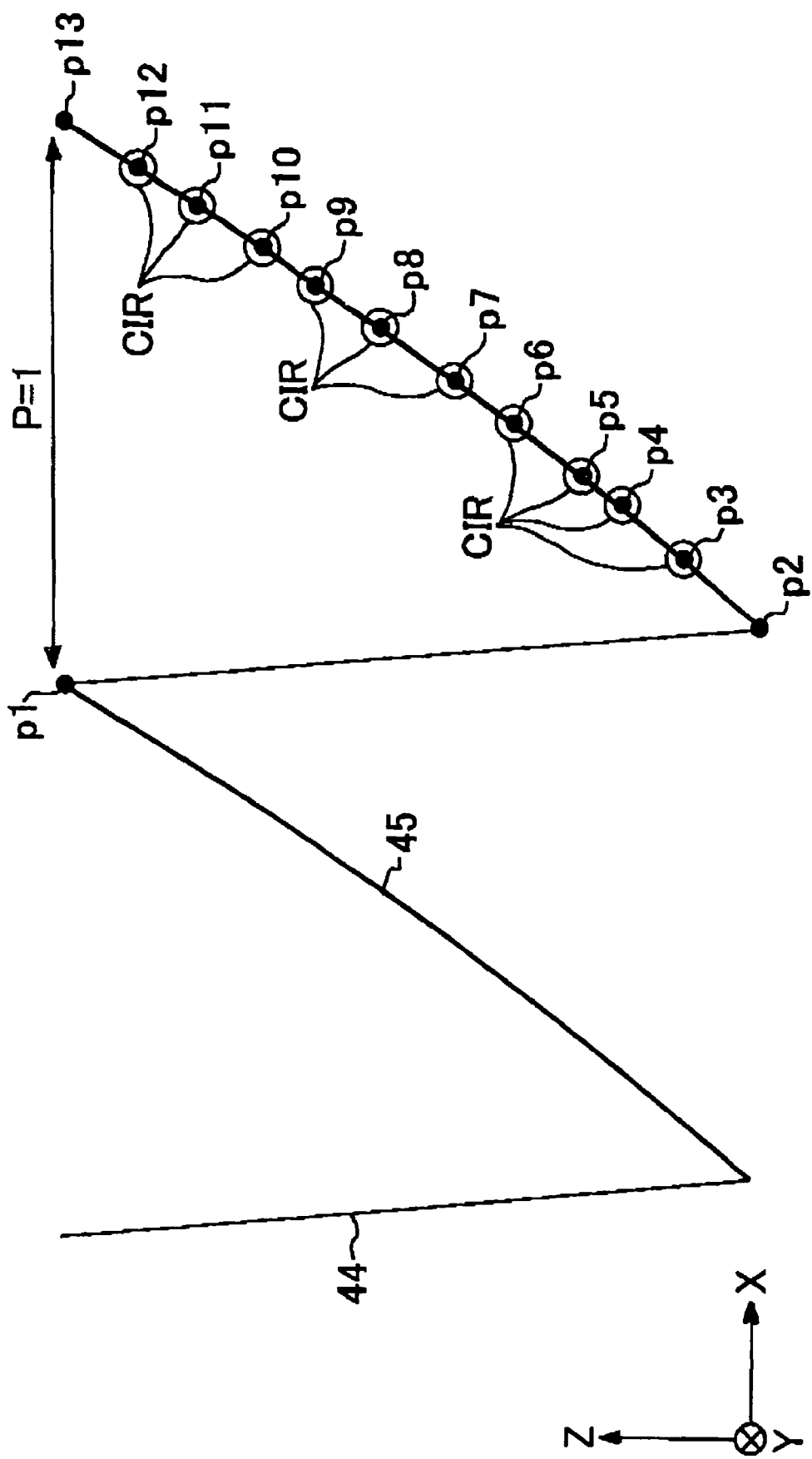
FIG. 22 is a schematic illustration of a profile formed by connecting in order the adjacent two of thirteen points.
Figure 23:
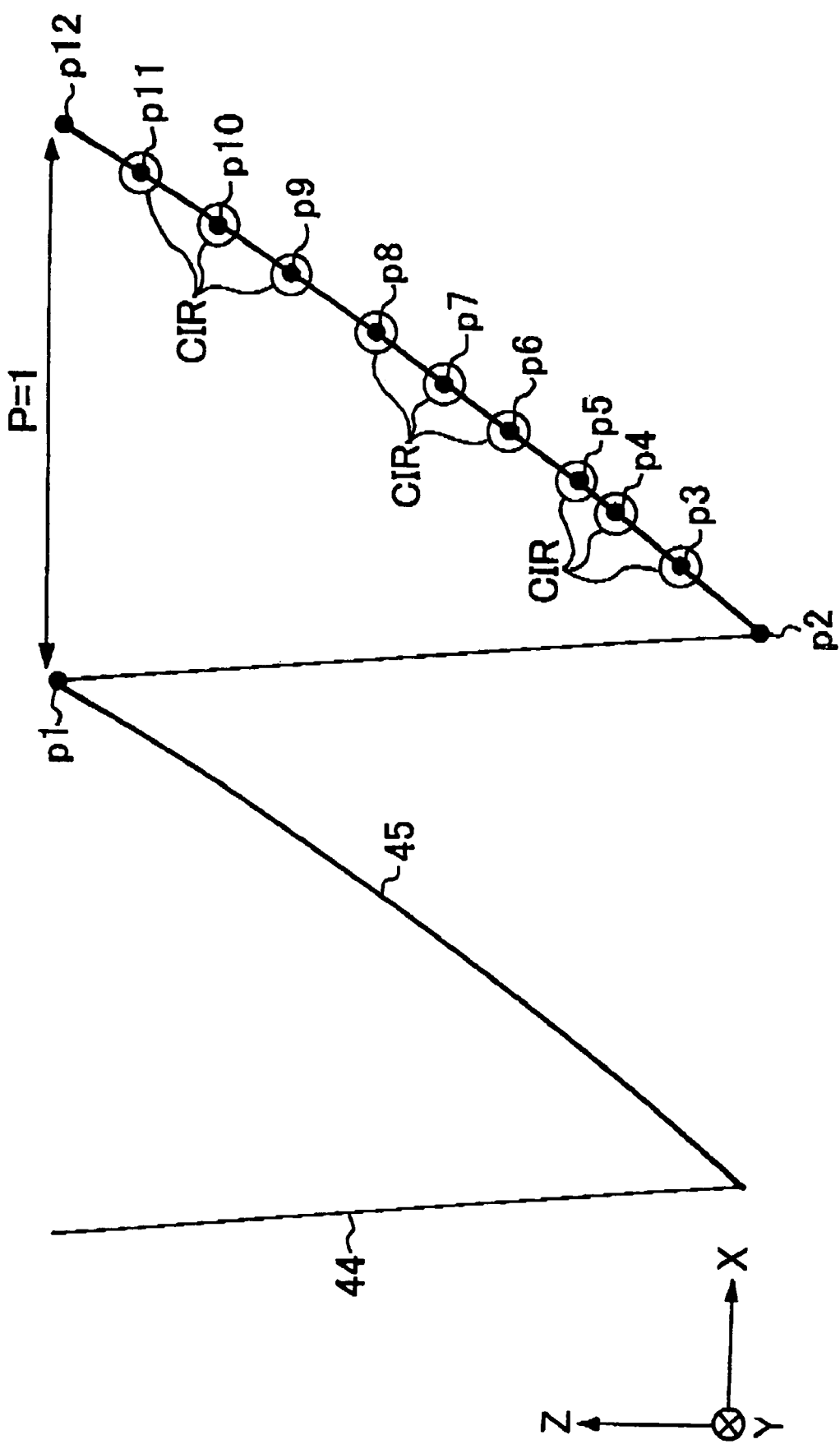
FIG. 23 is a schematic illustration of a profile formed by connecting in order the adjacent two of twelve points.

As specific profiles of the elongated prism, if (x, z) coordinate system is adopted in which a vertex of each of the elongated prisms is assumed to be an origin of the coordinate system and a length of a pitch P of the elongated prisms is normalized to 1, the elongated prism may preferably have fifteen (15) planar surfaces and show a cross section formed by connecting in order the adjacent two of sixteen (16) points (p1-p16 in FIG. 21) of point 1 (−0.111, 1.27), point 2 (0.0, 0.0), point 3 (0.159, 0.195), point 4 (0.212, 0.260), point 5 (0.265, 0.328), point 6 (0.319, 0.398), point 7 (0.372, 0.470), point 8 (0.425, 0.544), point 9 (0.478, 0.621), point 10 (0.531, 0.699), point 11 (0.584, 0.780), point 12 (0.637, 0.861), point 13 (0.690, 0.945), point 14 (0.743, 1.030), point 15 (0.796, 1.117) and point 16 (0.889, 1.27). Alternatively, the elongated prism may have eleven (11) planar surfaces and show a cross section formed by connecting in order the adjacent two of twelve (12) points (p1-p12 in FIG. 23) of point 1 (−0.284, 1.059), point 2 (0.000, 0.000), point 3 (0.212, 0.278), point 4 (0.265, 0.350), point 5 (0.319, 0.423), point 6 (0.372, 0.501), point 7 (0.425, 0.581), point 8 (0.478, 0.663), point 9 (0.531, 0.748), point 10 (0.584, 0.834), point 11 (0.637, 0.922) and point 12 (0.716, 1.059). Still alternatively, the elongated prism may have twelve (12) planar surfaces and show a cross section formed by connecting in order the adjacent two of thirteen (13) points (p1-p13 in FIG. 22) of point 1 (−0.206, 1.168), point 2 (0.000, 0.000), point 3 (0.159, 0.204), point 4 (0.212, 0.273), point 5 (0.265, 0.343), point 6 (0.319, 0.416), point 7 (0.372, 0.490), point 8 (0.425, 0.567), point 9 (0.478, 0.646), point 10 (0.531, 0.727), point 11 (0.584, 0.810), point 12 (0.637, 0.897) and point 13 (0.794, 1.168).

It is not necessary to form the above mentioned cross section so as to rigorously pass through all the sixteen (16) points, twelve (12) points or thirteen (13) points. Little displacement from each of the points (to pass through their neighborhood points) does not significantly affect the intensity of peak light. However, when the length of the pitch P of the elongated prisms is normalized to 1, it is desirable that the displacement of each of at least five (5) points in the sixteen (16) points, twelve (12) points or thirteen (13) points is such that the displaced point is found inside a circle (CIR in FIGS. 21-23) centered at the corresponding proper point with a radius of 0.021, preferably with a radius of 0.018, more preferably with a radius of 0.014. It is most desirable that the displacement of each of eight (8) points is such that the displaced point is found inside a circle with a radius of 0.014.

Figure 17:
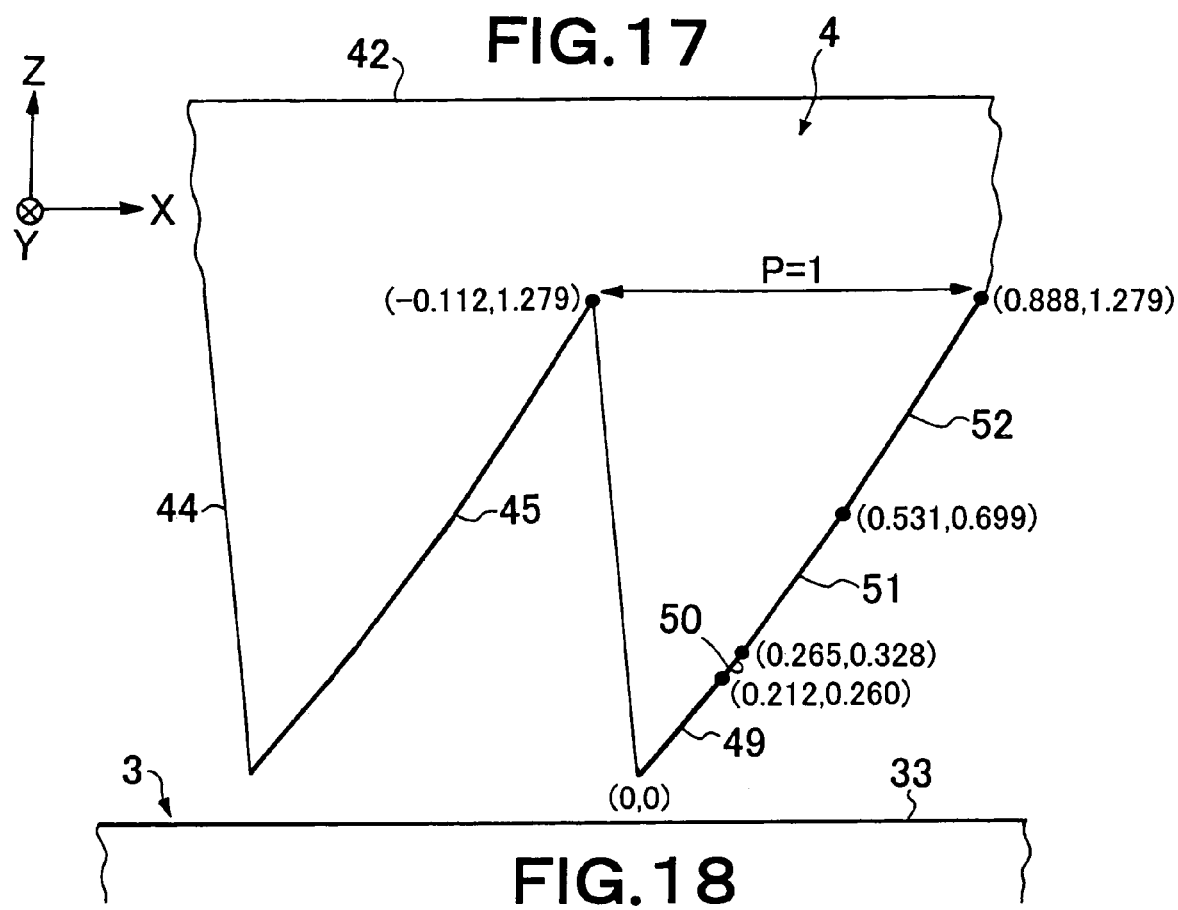
FIG. 17 is a schematic illustration of a couple of elongated prisms of the light deflector according to the invention that are arranged at the light input surface thereof, showing their profiles.

For the purpose of the present invention, at least one of the surfaces having different angles of inclination of the prism face may be replaced by a convex curved surface as shown in FIG. 17, or all the surfaces may be replaced by convex curved surfaces. In other words, the prism face may be formed by using one or more planar surfaces and one or more convex curved surfaces or by using two or more convex curved surfaces having different angles of inclination. In FIG. 17, the second prism face 45 is divided into four (4) areas including two planar surfaces 49, 50 and two convex curved surfaces 51, 52. The convex curved surface 51 is expressed as a part of a circle centered at point (−5.025, 4.389) with a radius R=6.669 in cross section, while the convex curved surface 52 is expressed as a part of a circle centered at point (−6.672, 5.537) with a radius R=8.677 in cross section. When the prism face is formed by a plurality of convex curved surfaces with different angles of inclination, it is possible to reduce the number of areas to 2 to 10, preferably to 2 to 5, which is smaller than that of the prism face formed by a plurality of planar surfaces with different angles of inclination. Preferably, however, the number of areas is 3 to 4 because it is difficult to design each of the convex curved surfaces necessary for adjusting the distribution of emitted light to a desired one when the number of areas is too small.

The profile of the convex curved surface or each of the convex curved surfaces may be a part of a circle or non-circular in cross section along the XY plane. When the prism face is formed by a plurality of convex curved surfaces, the convex curved surfaces may preferably show different profiles including those of convex curved surfaces each of which is a part of a circle in cross section and those of convex curved surfaces that are non-circular in cross section. The non-circular cross section may be a part of an ellipse or a part of a parabola.

For the purpose of the present invention, the angle of inclination of a convex curved surface refers to the angle of inclination of the plane connecting the related opposite edges of the convex curved surface (that corresponds to the chord of the convex curved line in cross section) to each other relative to the elongated prism forming plane 43. When a convex curved surface is arranged at the vertex of the elongated prism, the vertex split angle refers to the angle formed by the plane connecting the related opposite ends of the convex curved surface to each other and the normal of the elongated prism forming plane 43.

As for the relationship between the pitch P of the elongated prisms and the length L2 of the virtual straight line (V) connecting the vertex (VER) and the trough section (TRO) of the elongated prism to each other in a cross section thereof as to the prism face 45, they preferably show a relationship of L2/P=1.1 to 1.7 for the purpose of increasing the quantity of light the prism face 45 receives, directing the angle of peak light in the distribution of the emitted light which has been internally reflected by each of the areas of the prism face of each elongated prism to the normal and preventing the vertex angle (α+β) of the elongated prism from becoming too small. The relationship is expressed by L2/P=1.16 to 1.6 more preferably, by L2/P=1.27 to 1.56 most preferably. As for the relationship between the length L1 of the virtual straight line connecting the vertex and the trough section of the elongated prism to each other in a cross section thereof as to the prism face 44 and the length L2 of the virtual straight line connecting the vertex and the trough section of the elongated prism to each other in a cross section thereof as to the prism face 45, the relationship is expressed preferably by L2/L1=1.1 to 1.3, more preferably by L2/L1=1.13 to 1.25, most preferably by L2/L1=1.16 to 1.22.

Figure 20:
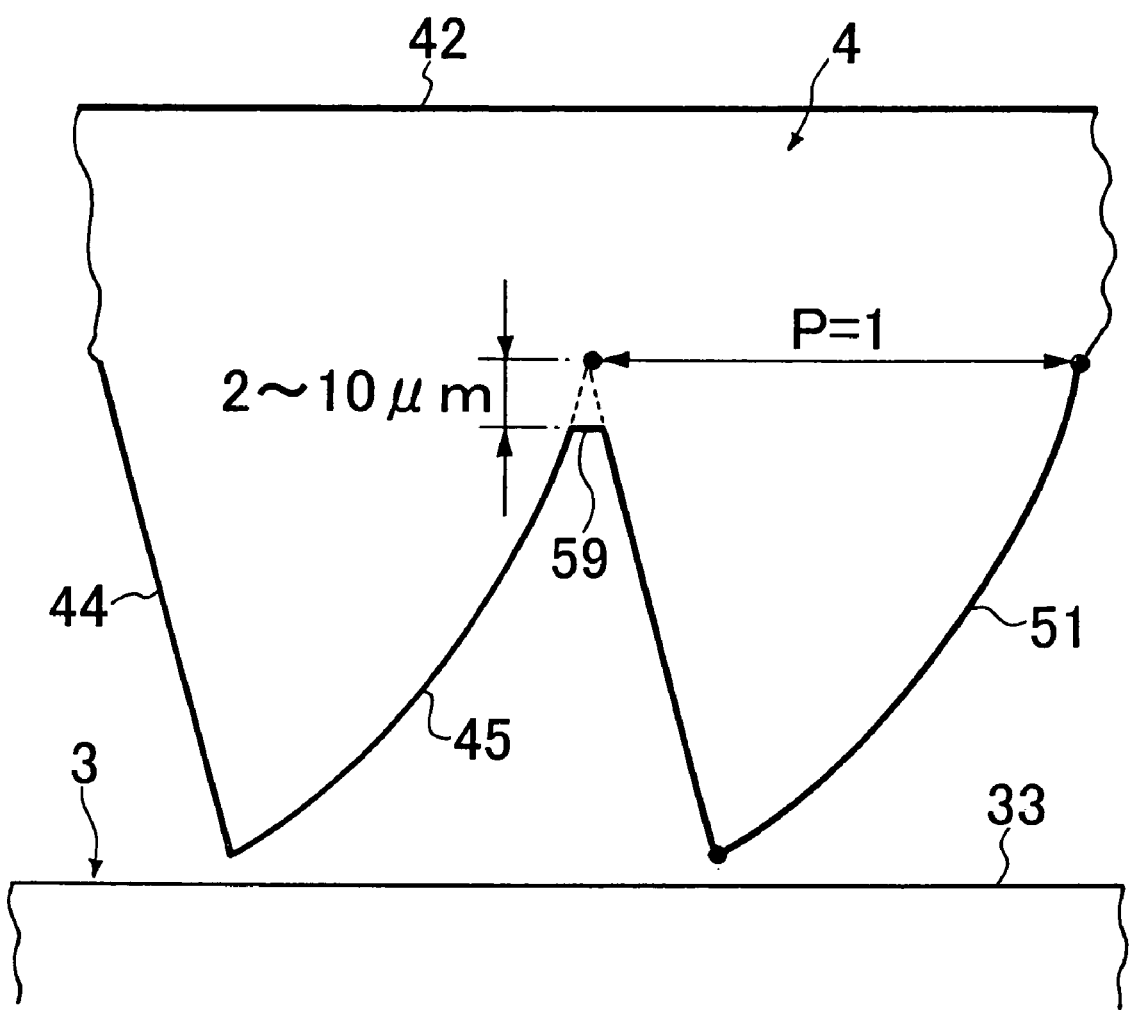
FIG. 20 is a schematic illustration of a couple of elongated prisms of the light deflector according to the invention that are arranged at the light input surface thereof, showing their profiles.

According to the invention, the cut angle of the trough section of each elongated prism is made small. Then, burrs can be produced at the trough sections in the manufacturing process to give rise to a defect that makes the trough sections of the elongated prism appear like so many stripes. It is preferable to arrange a flat section 59 between two adjacently located elongated prisms as shown in FIG. 20 in order to prevent such a defect from occurring. Such a flat section 59 is arranged at a position separated from the trough section that is produced when the flat section 59 is not formed preferably by 2 to 10 μm as shown in FIG. 20, more preferably by 2.5 to 5 μm, most preferably by 3 to 4 μm in the direction of the height of the elongated prism. This is because it tends to be difficult to prepare cutting tools for forming the pattern of elongated prisms to an enhanced degree of precision when the position is separated from the trough section by less than 2 μm, whereas the luminance of the light source device tends to fall when the position is separated from the trough section by more than 10 μm. In other words, the position for forming the flat section may be separated from the trough section that is produced when the flat section is not formed by a distance within a range between 0.035 and 0.18 in the direction of the height of the elongated prism when the length of the pitch P of the elongated prisms is normalized to 1 or within a range between 0.022 and 0.16 in the direction of the height of the elongated prism when the length L2 of the virtual straight line connecting the vertex and the trough section of the elongated prism to each other in a cross section thereof as to the prism face of the vertex split angle β is normalized to 1.

Figure 24:
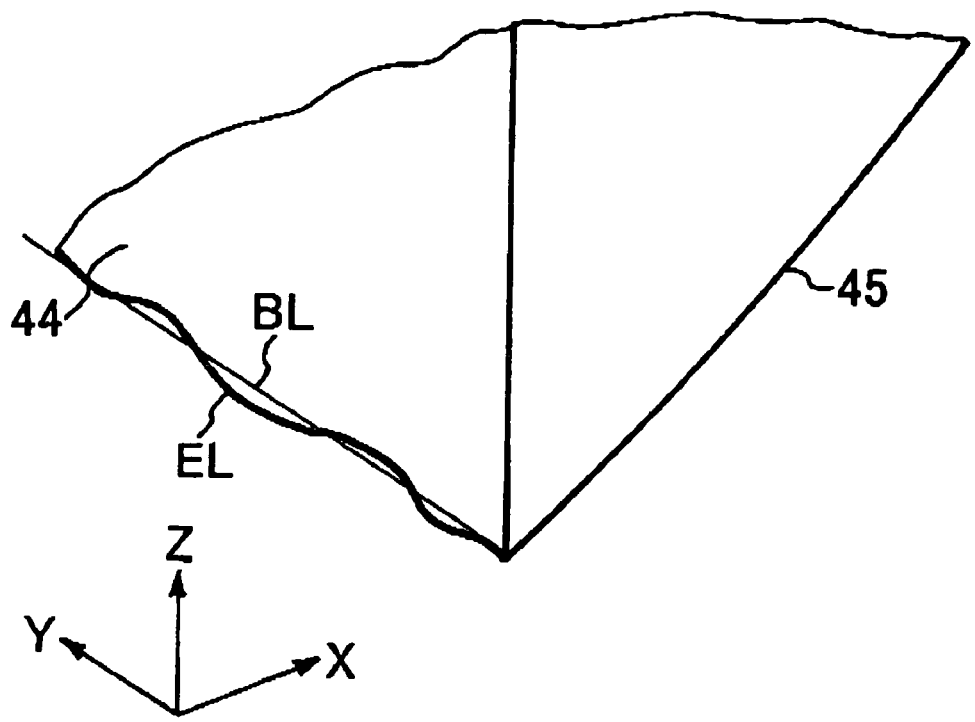
FIG. 24 is a schematic illustration of an edge line formed by two prism faces of each of the elongated prisms.

When the length of the pitch P of the elongated prisms is normalized to 1, the edge line (EL in FIG. 24) formed by the two prism faces of each elongated prism may be undulated by 0.018 to 0.354 relative to the base line (BL in FIG. 24) (located at the average height of the elongated prisms) for the edge line, preferably by 0.018 to 0.177, more preferably by 0.018 to 0.088, most preferably by 0.035 to 0.063. With such an arrangement, in a light deflector according to the invention that can converge incident light and emit it highly intensively in the viewing direction, it is possible to prevent glaring light viewed when a liquid crystal display element is observed after a light close to a collimated light is incident on the liquid crystal display element from appearing and make the defect of the light guide and that of the light deflector visually unclear to consequently minimize the uneven distribution of luminance to improve the quality of the light source device by forming undulations on the edge line in the Z-direction. On the other hand, a slight gap is produced between the light guide and the light deflector when undulations are formed on the edge line. Then, there is light emitted from the light guide which strikes the elongated prisms located at the side opposite to the primary light source relative to the elongated prism that the emitted light strikes when such a gap is not produced. Then, light emitted from the light guide in a direction close to the normal relative to emitted peak light may not strike the main reflection surface (the prism face remote from the primary light source) to consequently reduce the overall luminance to a corresponding extent. However, a light deflector according to the present invention is adapted to raise the luminance to a large extent, compensating the reduction in the luminance due to the undulations of the edge line, and consequently prevent the overall luminance reduction of the light deflector from occurring. For a light deflector according to the invention to satisfactorily realize its advantages, it is preferable to confine the undulations of the edge line to the above cited range. The method for forming undulations on the edge line is not subjected to any particular limitations. For example, there may be used a method of forming the light deflector with use of a lens mold manufactured by cutting a lens pattern on a surface thereof while applying specific vibrations or a method of forming the light deflector by grinding the edge line section of each elongated lens of a known lens sheet by means of fine sand paper, etc.

Figure 25:
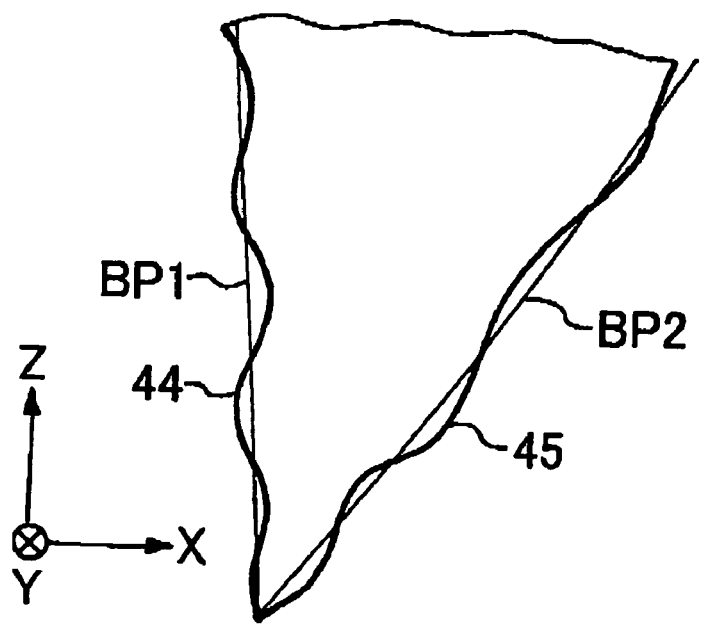
FIG. 25 is a schematic illustration of two prism faces of each of the elongated prisms.

When the length of the pitch P of the elongated prisms is normalized to 1, the quality of the light deflector can be improved by forming undulations on the two prism faces of each elongated prism by 0.012 to 0.334 relative to their respective base planes (BP1. BP2 in FIG. 25) (plane each including both the base line of the edge line and the bottom (BOT in FIG. 2) of the prism face (edge at the trough section side)) as in the case of forming undulations to the edge line.

The extent of undulations relative to the base planes is preferably 0.012 to 0.152, more preferably 0.012 to 0.076, most preferably 0.022 to 0.046.

When one of the prism faces is formed by a plurality of planar surfaces or convex curved surfaces with different angles of inclination in the light deflector 4 having the above described configuration, in order to secure sufficient light converging performance, the ratio (d/P) of the maximum distance (d) between the virtual plane (Q in FIG. 2) connecting the vertex (VER) and the bottom (BOT) of each elongated prism to each other and the plurality of planar surfaces or convex curved surfaces (actual prism face) relative to the pitch (P) of the elongated prisms is preferably 0.4 to 5%. This is because the light converging performance tends to be degraded to make it difficult to sufficiently improve the luminance when the ratio of d/P is lower than 0.4% or higher than 5%. More preferably, the ratio of d/P is within a range between 0.4 and 4.5%, most preferably between 0.7 and 4.0%. The ratio (r/P) of the radius of curvature (r) of the convex curved surface relative to the pitch (P) of the elongated prisms is preferably within a range between 2 and 50, more preferably within a range between 5 and 30, most preferably within a range between 6.5 and 12. This is because the light deflector cannot exhibit a sufficient light converging performance and the luminance tends to fall when the ratio of r/P is lower than 2 or higher than 50.

The full width at half maximum of the distribution of light emitted from a light deflector 4 having a configuration as described above in the XZ plane is preferably not smaller than 5 degrees and not greater than 25 degrees, more preferably not smaller than 10 degrees and not greater than 20 degrees, most preferably not smaller than 11 degrees and not greater than 15 degrees. This is because the view field is not extremely narrowed and the displayed image can be viewed without difficulty when the full width at half maximum of the distribution of emitted light is not smaller than 5 degrees and the luminance is remarkably improved when the full width at half maximum of the distribution of emitted light is not greater than 25 degrees.

The primary light source 1 is a linear light source that extends in the Y-direction. A fluorescent lamp or a cold cathode tube may be used for the primary light source 1. However, the primary light source 1 is not limited to a linear light source and a point light source such as an LED light source, a halogen lamp or a metal halide lamp may also be used for the purpose of the present invention. Particularly, it is preferable to use a relatively small point light source such as an LED for the small display apparatus of a portable telephone or a personal digital assistant. Additionally, a second primary light source may be arranged at the lateral end face opposite to the lateral end face where the first primary light source 1 is arranged as shown in FIG. 1, whenever necessary.

Figure 18:
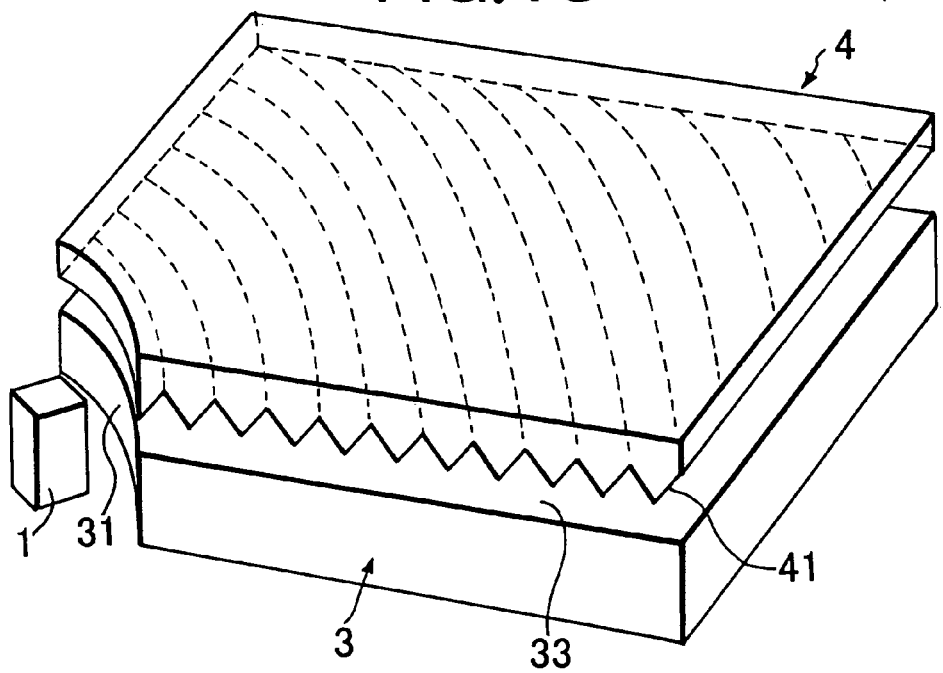
FIG. 18 is a schematic perspective view of a substantially spot-shaped light source arranged adjacent to a corner section of a light guide.

When a linear light source is used for the primary light source 1 as shown in FIG. 1 for the purpose of the present invention, the elongated prisms of the light deflector 4 are arranged so as to extend substantially in parallel with the primary light source 1 or in a direction showing an angle of not greater than 20° relative to the primary light source 1. However, the arrangement of the elongated prisms of the light deflector 4 may be modified depending on the primary light source to be used with it and/or the direction of propagation of light in the light guide 3. For example, when a substantially spot-shaped light source such as an LED light source is arranged at a corner of the light guide 3 as shown in FIG. 18, light entering the light guide 3 is propagated through the light guide 3 in radial directions extending from the primary light source 1 in a plane identical with the light emitting surface 33, whereas light emitted from the light emitting surface 33 is also in radial directions extending from the primary light source 1. The elongated prisms of the light deflector 4 are preferably arranged in parallel to each other in such a way that they substantially form so many arcs that surround the primary light source 1 in order to deflect light emitted in radial directions efficiently to a desired direction regardless of the radial directions of emission of light. As a result of arranging elongated prisms in parallel to each other in such a way that they substantially form so many arcs that surround the primary light source 1, light emitted from the light emitting surface 33 in radial directions mostly enters the elongated prisms of the light deflector 4 substantially perpendicularly to the latter so that it is possible to efficiently direct emitted light in a specific direction over the entire region of the light emitting surface 33 of the light guide 3 and consequently improve the uniformity of luminance. It is preferable to select the degree of arc depending on the distribution of light propagated through the light guide 3 for the elongated prisms of the light deflector 4 that substantially form arcs in such a way that light emitted from the light emitting surface 33 in radial directions mostly enters the elongated prisms substantially perpendicularly relative to the latter. More specifically, the arc-shaped elongated prisms may be arranged concentrically and centered at the point light source such as an LED and the radii of the arc-shaped elongated prisms may be increased as a function of the distance from the point light source. The range of radius of the elongated prisms may be determined depending on the positional relationship between the position of the point light source in the planar light source system and the effective area of the planar light source system that corresponds to the liquid crystal display area.

The light source reflector 2 guides light from the primary light source 1 to the light guide 3. As for the material thereof, a plastic film having a metal deposit reflection layer on the surface thereof may be used. As illustrated, the light source reflector 2 is wound so as to extend from a position near the related edge of the outer surface of the light reflector 5 to the edge of the light output surface of the light diffuser 6 by way of the outer surface of the primary light source 1. However, the light source reflector 2 may alternatively be wound so as to extend from a position near the related edge of the outer surface of the light reflector 5 to the edge of the light emitting surface of the light guide 3 by way of the outer surface of the primary light source 1 so as to avoid the light diffuser 6 and the light deflector 4.

A reflection member similar to the light source reflector 2 may also be arranged at each of the lateral end faces of the light guide 3 other than the lateral end face 31. A plastic sheet having a metal deposit reflection layer on the surface may be used for the light reflector 5. For the purpose of the present invention, the light reflecting sheet of the light reflector 5 may be replaced by a light reflection layer formed on the rear surface 34 of the light guide 3 by depositing metal by evaporation.

For the purpose of the present invention, both the light guide 3 and the light deflector 4 may be made of synthetic resin showing a high light transmittance. Examples of synthetic resin include methacrylic resin, acrylic resin, polycarbonate type resin, polyester type resin and vinyl chloride type resin, of which methacrylic resin is most suitable because it shows a high light transmittance, a high thermal resistance, excellent dynamic characteristics and excellent moldable properties. Preferably, methacrylic resin containing methyl methacrylate as principal ingredient by not less than 80 wt % is used. When forming the surface structure such as coarse surface, elongated prisms, or the like of the light guide 3 or the light deflector 4, a transparent synthetic resin plate may be hot pressed by means of a molding member having a desired surface structure or the surface structure may be formed at the time of molding by screen printing, extrusion molding or injection molding. Alternatively, the structural surface may be formed by using thermo-setting or photo-setting resin. Still alternatively, a coarse surface structure or an elongated prism arrangement structure made of active energy-ray-setting type resin may be formed on the surface of a transparent base member such as a transparent film or sheet made of polyester type resin, acryl type resin, polycarbonate type resin, vinyl chloride type resin or polymethacryl imide type resin. Still alternatively, such a sheet may be bonded to a separate transparent base member by adhesive bonding or fusion bonding to make them integral with each other. Examples of active energy-ray-setting type resin include multi-functional acrylic (methacrylic) compounds, vinyl compounds, acrylates (methacrylates), arylic compounds and metal acrylates (methacrylates).

A liquid crystal display apparatus is formed by arranging a liquid crystal display element on the light emitting surface of a planar light source device comprising a primary light source 1, a light source reflector 2, a light guide 3, a light deflector 4 and a light reflector 5 along with a light diffuser 6 (the light emitting surface being the light output surface 42 of the light deflector 4 as well as the upper surface of the light deflector 6). The liquid crystal display apparatus is designed so as to be viewed by the user from above in FIG. 1 through the liquid crystal display element. Additionally, according to the present invention, it is also possible to cause sufficiently collimated light showing a narrow distribution pattern to enter the liquid crystal display element with use of the planar light source device in order to display an image that is free from a phenomenon of reversal tone and excellent in terms of uniformity of brightness and hue on the liquid crystal display element and at the same time produce an intensive light irradiation in a desired direction to improve the efficiency of utilization of light emitted from the primary light source for the light irradiation in that direction.

Furthermore, it is possible to adjacently arrange the light diffuser 6 on the light output surface of the light deflector 4 in a light source device according to the invention that provides a narrowed view field and an enhanced level of luminance due to the light deflector 4 in order to appropriately control the view field depending on the application thereof without reducing the luminance. Additionally, according to the present invention, it is also possible to suppress glaring light and bright spots that can reduce the quality of the light source device from appearing and improve the quality thereof by arranging such a light diffuser 6.

The light diffuser 6 may be integrally formed with the light deflector 4 at the light output surface side of the light deflector 4 or separately mounted on the light output surface of the light deflector 4. It is more preferable to arrange the light diffuser 6 separately. When the light diffuser 6 is mounted separately, it is preferable to provide the surface of the light diffuser 6 located adjacent to the light deflector 4 with undulations in order to prevent it from sticking to the light deflector 4. Similarly, it is preferable to provide the light emitting surface of the light diffuser 6 also with undulations from the viewpoint of preventing it from sticking to the liquid crystal display element to be arranged on it. When such undulations are formed simply for the purpose of prevention of sticking, the average angle of inclination is preferably not smaller than 0.7 degrees, more preferably not smaller than 1 degree, most preferably not smaller than 1.5 degrees.

For the purpose of the present invention, it is necessary to use a light diffuser 6 showing light diffusing characteristics that appropriately diffuse light emitted from the light deflector 4, taking the balance of the luminance characteristics, the viewability and the quality of the light source device into consideration. More specifically, when the light diffuser 6 shows a poor light diffusing effect, it is difficult to sufficiently broaden the view angle so that the viewability can be degraded and the effect of improving the quality can be insufficient. When, to the contrary, the light diffusing effect is excessive, the effect of narrowing the view field of the light deflector 4 can be damaged and the overall light transmittance is lowered to reduce the luminance. Thus, a light diffuser 6 showing a full width at half maximum of 1 to 13 degrees in the distribution of light emitted from it after receiving collimated light is used for the purpose of the present invention. The full width at half maximum of the light diffuser 6 is preferably in a range between 3 and 11 degrees, more preferably in a range between 4 and 8.5 degrees. For the purpose of the present invention, the full width at half maximum of the distribution of emitted light of the light diffuser 6 represents the extent of diffusion of light emitted from the light diffuser 6 after collimated light is entered to the light diffuser 6 as shown in FIG. 19 and refers to the angle of the full width ($\Delta\theta_H$) of the half value of the peak value in the distribution of luminous intensity of light emitted from the light diffuser 6 after light is transmitted through and diffused by the light diffuser 6.

The light diffusing characteristic of the light diffuser 6 can be produced by mixing a light diffusing agent into the light diffuser 6 or forming undulations at least on one of the surfaces of the light diffuser 6. The extent of undulations differs between the undulations formed on one of the surfaces of the light diffuser 6 and the undulations formed on both of the surfaces of the light diffuser 6. When undulations are formed on one of the surfaces of the light diffuser 6, the average angle of inclination thereof is preferably within a range between 0.8 and 12 degrees, more preferably within a range between 3.5 and 7 degrees, most preferably within a range between 4 and 6.5 degrees. When, on the other hand, undulations are formed on both of the surfaces of the light diffuser 6, the average angle of inclination thereof for one of the surfaces is preferably within a range between 0.8 and 6 degrees, more preferably within a range between 2 and 4 degrees, most preferably within a range between 2.5 and 4 degrees. Additionally, the average angle of inclination at the light incident side of the light diffuser 6 is preferably made greater than the average angle of inclination at the light emitting side of the light diffuser 6 for the purpose of suppressing the reduction in the overall light transmittance of the light diffuser 6. The haze value of the light diffuser 6 is preferably within a range between 8 and 82% from the viewpoint of improving the luminance and the viewability, more preferably within a range between 30 and 70%, most preferably within a range between 40 and 65%.

The luminance in the display area of a light source device according to the invention as viewed in the direction of the normal to the light emitting surface (the light emitting surface of the light diffuser 6) is required to be uniform. The uniformity of luminance largely depends on the display area of the light source device. A relatively wide view angle characteristic may be required to a large light source device having a large display area such as the one used in a notebook-sized personal computer or a monitor. Then, the distribution of light emitted from the light emitting surface is required to be made broader. On the other hand, priority may be given to luminance and display quality for a compact light source device having a small display area such as the one used in a portable telephone or a personal digital assistant. Then, the distribution of light emitted from the light emitting surface may be relatively narrow. Thus, it is preferable to use a light diffuser 6 that shows appropriate light diffusing characteristics depending on the size of the display area of the light source device.

For the purpose of the present invention, it is also possible to use a light deflector 4 so as to make it emit light emitted from the light guide 3 in a specific direction, in the direction of the normal for example, and then use a light diffuser 6 showing an anisotropic light diffusing effect so as to make it emit light in a desired direction. Then, it is possible to provide the light diffuser 6 with both an anisotropic light diffusing effect and a light deflecting effect. For example, elongated lenticular lenses or cylindrical lenses are used to produce undulations, the light diffuser 6 can be provided with both an anisotropic light diffusing effect and a light deflecting effect by making the cross section of the elongated lenticular lenses or cylindrical lenses asymmetric.

For the purpose of the present invention, it is also possible to make the light deflector 4 and/or the light diffuser 6 contain a light diffusing material for the purpose of adjusting the view angle of the light source device and improving the quality thereof. Such a light diffusing material may be in the form of transparent fine particles showing a refractive index different from that of the material of the light deflector 4 and/or the light diffuser 6. Examples of light diffusing material include silicone beads, and polymers or copolymers of polystyrene, polymethyl methacrylate and fluorinated methacrylate. The content, the particle size and the refractive index of the light diffusing material to be used for the light deflector 4 and/or the light diffuser 6 need to be selected appropriately so as not to damage the view field narrowing effect of the light deflector 4 and the appropriate light diffusing effect of the light diffuser 6. For example, a light diffusing material gives rise to a light diffusing effect only to a slight extent when the difference between its own refractive index and the refractive index of the material of the light deflector 4 and that of the light diffuser 6 is too small, whereas it gives rise to an excessive light scattering/refracting effect when the difference is too large. Therefore, the difference of refractive index is preferably within a range between 0.01 and 0.1, more preferably within a range between 0.03 and 0.08, most preferably within a range between 0.03 and 0.05. Additionally, the scattering effect will be excessive to give rise to glaring light and a reduced luminance when the particle size of the light diffusing material is too large, whereas a coloring effect can be produced when the particle size of the light diffusing material is too small. Therefore, the average particle size or diameter is preferably within a range between 0.5 and 20 μm, more preferably within a range between 2 and 15 μm, most preferably within a range between 2 and 10 μm.

The distribution of emitted light of a light source device realized by using a light deflector according to the invention can be asymmetric relative to a peak light direction, so that the luminance can abruptly fall at the primary light source side when moved away from the peak light whereas it relatively gradually falls at the side remote from the primary light source when moved away from the peak light. Therefore, for example, when a light source device showing such a distribution pattern of emitted light is used in the liquid crystal display apparatus of a notebook-sized personal computer of 10 inches or more or the like that requires a relatively wide view angle, it is a common practice to broaden the distribution of emitted light and hence the view angle of the liquid crystal display apparatus by arranging a light diffuser showing a relatively high light diffusing effect on the light output surface of the light deflector. When a light diffuser that shows a high light diffusing effect with a haze value of not less than 50%, the angle of peak light of the distribution of emitted light is deflected toward the side remote from the primary light source by 1 to 3 degrees. Therefore, when the angle of peak light of the distribution of light emitted from the light deflector is located in the direction of the normal to the light output surface thereof, the angle of peak light of the distribution of emitted light is deflected by the light diffuser to the side remote from the primary light source by 1 to 3 degrees from the direction of the normal so that the luminance is extremely lowered when the display apparatus is viewed along the direction of the normal as a result. This means that, while the asymmetry of the distribution of light emitted from the light deflector is corrected to some extent by the use of a light diffuser, the site where the luminance falls relatively extremely is located in the direction of the normal. Therefore, it is preferable to tilt the angle of peak light of the distribution of light emitted from the light deflector toward the light source side by 1 to 3 degrees in advance in order to avoid such an extremely fall of luminance.

Now, the present invention will be described further by way of example. In the following examples, certain physical properties were measured in a manner as described below.

Measurement of Luminance on the Normal to the Planar Light Source Device and Full Width at Half Maximum of Luminous Intensity A cold cathode tube was used as light source and energized at a high frequency by applying DC 12V to an inverter (HIU-742A: tradename, available from Harrison Co., Ltd.). To measure the full width at half maximum of the luminous intensity of the light guide, a sheet of black paper having a pin pole of 4 mm was rigidly bonded to the surface of the light guide in such a way that the pin hole was aligned to the center of the surface and the distance was adjusted in such a way that the measurement circle of a luminance meter was found to be 8 to 9 mm large while the rotary shafts of the goniometer rotated with the pinhole positioned at the rotation center around a direction perpendicular to and also in a direction parallel to the longitudinal direction of the cold cathode tube. The distribution of luminous intensity of emitted light was observed by means of the luminance meter, while rotating the respective rotary shafts in each of the above directions between +80° and −80° stepwise at a pitch of 1° to determine the angle of peak light (peak angle) and the full width at half maximum (the spreading angle of distribution at ½ of a peak value) of the distribution of luminous intensity. As for the full width at half maximum of the luminance of the planar light source device, field of the luminance meter was adjusted in such a way that the field angle was equal to 0.1 degree and detection area was set to the center of the light emitting surface of the planar light source device. The rotary shafts of the goniometer were driven to rotate around each of the above directions between +80° and −80° stepwise at a pitch of 1° and the luminance distribution of emitted light was observed by means of the luminance meter to determine the peak luminance and the angle of peak light (peak angle). The angle of peak light was expressed to be negative at the primary light source side and positive at the opposite side relative to the direction of the normal to the light source device, which direction was expressed as 0°.

EXAMPLE 1

A light guide having a mat-finished surface (with an average angle of inclination of 1.1 degrees) on one of the surfaces thereof was prepared by injection molding of acrylic resin (Acrypet VH5#000: tradename, available from Mitsubishi Rayon Co., Ltd.). The light guide showed a profile like a wedge-shaped plate that was 216 mm×290 mm large and 2.0 mm to 0.7 mm thick. A prism layer was formed on the mirror surface of the light guide by means of acryl type UV-setting resin in such a way that elongated prisms with a prism vertex angle of 100° were arranged in parallel to each other at a pitch of 50 μm so as to make them run in parallel with the 216 mm sides (short sides) of the light guide. A cold cathode tube was covered by a light source reflector (silver reflection film available from Reiko Co., Ltd.) and arranged along the lateral end face (end face at the 2.0 mm thick side of the light guide) of the light guide that corresponds to one of the 290 mm sides (long sides). A light diffusion/reflection film (E60: tradename, available from Toray Industries, Inc.) was fixed by adhesion to the other lateral end faces, and a reflection film was arranged on the surface (rear surface) where the elongated prisms were formed. The above-described structure was put into a corresponding frame. The light guide showed the angle of peak light of the distribution of emitted light that was equal to 70 degrees relative to the normal to the light emitting surface and a full width at half maximum of 22.5 degrees in a plane perpendicular to both the light incident surface and the light emitting surface.

On the other hand, there was prepared a prism sheet of 188 μm thick polyester film having elongated prisms that were arranged in parallel to each other at a pitch of 56.5 μm on one surface of the polyester film. The elongated prisms were made of acryl type UV-setting resin with the refractive index of 1.5064. Each elongated prism was provided with eleven (11) planar surfaces and showed a profile in cross section formed by connecting in order the adjacent two of twelve (12) points including point 1 (−16.031, 59.828), point 2 (0.000, 0.000), point 3 (12.000, 15.695), point 4 (15.000, 19.750), point 5 (18.000, 23.925), point 6 (21.000, 28.320), point 7 (24.000, 32.818), point 8 (27.000, 37.455), point 9 (30.000, 42.238), point 10 (33.000, 47.114), point 11 (36.000, 52.087) and point 12 (40.469, 59.828) to each other (the coordinate values being expressed on the unit of μm throughout the examples and comparative examples).

The vertex split angle α was 15 degrees and the vertex split angle β was 37.4 degrees in the prism sheet. The angles of inclination of the ten (10) planar surfaces that correspond to points 2 through 12 were 52.6 degrees, 53.5 degrees, 54.3 degrees, 55.5 degrees, 56.3 degrees, 57.1 degrees, 57.9 degrees, 58.4 degrees, 58.9 degrees and 60.0 degrees in the ascending order.

As for the lengths L1 and L2 of the surfaces of each of the elongated prisms and the pitch P of arrangement of the elongated prisms of the prism sheet, they showed relationships of L2/P=1.279 and L2/L1=1.167. The ratio of the maximum distance d between the virtual plane connecting the vertex and the bottom of each of the elongated prisms and the actual prism face that corresponds to the points 2 through 12 to the pitch P of arrangement of the elongated prisms was d/P=2.7%. The degree of undulation of the edge lines of the elongated prisms relative to the base line was 0.053, whereas the degree of undulation of the prism face relative to the base plane was 0.036. The obtained prism sheet was practically free from optical defects that could otherwise have been formed during the process of molding the elongated prisms.

A planar light source device was obtained by mounting the obtained prism sheet on the light guide in such a way that the elongated prism forming surface was located vis-à-vis the light emitting surface of the light guide and the edge lines of the elongated prisms were in parallel with the light incident surface of the light guide while the first prism face (corresponding to the line connecting point 1 to point 2 and so in the remaining examples and the comparative examples) was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 2

A prism sheet was prepared as in Example 1 except that each elongated prism was provided with eleven (12) planar surfaces and showed a profile in cross section formed by connecting in order the adjacent two of thirteen (13) points including point 1 (−11.638, 66.002), point 2 (0.000, 0.000), point 3 (9.000, 11.519), point 4 (12.000, 15.443), point 5 (15.000, 19.396), point 6 (18.000, 23.480), point 7 (21.000, 27.686), point 8 (24.000, 32.018), point 9 (27.000, 36.483), point 10 (30.000, 41.067), point 11 (33.000, 45.776), point 12 (36.000, 50.653) and point 13 (44.862, 66.002) to each other.

The vertex split angle α was 10 degrees and the vertex split angle β was 38 degrees in the prism sheet. The angles of inclination of the eleven (11) planar surfaces that correspond to points 2 through 13 were 52.0 degrees, 52.6 degrees, 52.8 degrees, 53.7 degrees, 54.5 degrees, 55.3 degrees, 56.1 degrees, 56.8 degrees, 57.5 degrees, 58.4 degrees and 60.0 degrees in the ascending order.

As for the lengths L1 and L2 of the surfaces of each of the elongated prisms and the pitch P of arrangement of the elongated prisms of the prism sheet, they showed relationships of L2/P=1.414 and L2/L1=1.192. The ratio of the maximum distance d between the virtual plane connecting the vertex and the bottom of each of the elongated prisms and the actual prism face that corresponds to the points 2 through 13 to the pitch P of arrangement of the elongated prisms was d/P=3.3%. The degree of undulation of the edge lines of the elongated prisms relative to the base line was 0.053, whereas the degree of undulation of the prism face relative to the base plane was 0.036. The obtained prism sheet showed optical defects to a slight extent that had been formed during the process of molding the elongated prisms.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 3

A prism sheet was prepared as in Example 1 except that each elongated prism was provided with three (3) planar surfaces and two (2) convex curved surfaces, in which the planar surfaces showed a profile in cross section formed by connecting in order the adjacent two of four points including point 1 (−11.605, 65.814), point 2 (0.000, 0.000), point 3 (9.000, 11.519) and point 4 (15.000, 19.396) to each other and the convex curved surfaces showed a profile in cross section formed by connecting point 4 to point 5 (36.000, 50.653) by means of a circle centered at point A (−314.871, 263.703) and having a radius of 410.489 and connecting point 5 to point 6 (44.895, 65.814) by means of a circle centered at point B (−502.516, 376.787) and having a radius of 629.574.

The vertex split angle α was 10 degrees and the vertex split angle β was 38 degrees in the prism sheet. The angles of inclination of the two (2) planar surfaces that correspond to points 2 through 4 and the two (2) convex curved surfaces that correspond to points 4 through 6 were 52.0 degrees, 52.7 degrees, 56.1 degrees and 59.6 degrees in the ascending order.

As for the lengths L1 and L2 of the surfaces of each of the elongated prisms and the pitch P of arrangement of the elongated prisms of the prism sheet, they showed relationships of L2/P=1.412 and L2/L1=1.194. The ratio of the maximum distance d between the virtual plane connecting the vertex and the bottom of each of the elongated prisms and the actual prism face that corresponds to the points 2 through 6 to the pitch P of arrangement of the elongated prisms was d/P=3.1%. The degree of undulation of the edge lines of the elongated prisms relative to the base line was 0.053, whereas the degree of undulation of the prism face relative to the base plane was 0.036. The obtained prism sheet showed optical defects to a slight extent that had been formed during the process of molding the elongated prisms.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 4

A prism sheet was prepared as in Example 1 except that each elongated prism was provided with eleven (15) planar surfaces and showed a profile in cross section formed by connecting in order the adjacent two of sixteen (16) points including point 1 (−6.292, 71.920), point 2 (0.000, 0.000), point 3 (9.000, 10.996), point 4 (12.000, 14.687), point 5 (15.000, 18.527), point 6 (18.000, 22.494), point 7 (21.000, 26.563), point 8 (24.000, 30.753), point 9 (27.000, 35.070), point 10 (30.000, 39.517), point 11 (33.000, 44.050), point 12 (36.000, 48.669), point 13 (39.000, 53.378), point 14 (42.000, 58.179), point 15 (45.000, 63.114) and point 16 (50.208, 71.920) to each other.

The vertex split angle α was 5 degrees and the vertex split angle β was 39.3 degrees in the prism sheet. The angles of inclination of the fourteen (14) planar surfaces that correspond to points 2 through 16 were 50.7 degrees, 50.9 degrees, 52.0 degrees, 52.9 degrees, 53.6 degrees, 54.4 degrees, 55.2 degrees, 56.0 degrees, 56.5 degrees, 57.0 degrees, 57.5 degrees, 58.0 degrees, 58.7 degrees and 59.4 degrees in the ascending order.

As for the lengths L1 and L2 of the surfaces of each of the elongated prisms and the pitch P of arrangement of the elongated prisms of the prism sheet, they showed relationships of L2/P=1.555 and L2/L1=1.217. The ratio of the maximum distance d between the virtual plane connecting the vertex and the bottom of each of the elongated prisms and the actual prism face that corresponds to the points 2 through 16 to the pitch P of arrangement of the elongated prisms was d/P=3.7%. The degree of undulation of the edge lines of the elongated prisms relative to the base line was 0.053, whereas the degree of undulation of the prism face relative to the base plane was 0.036. The obtained prism sheet showed optical defects to a slight extent that had been formed during the process of molding the elongated prisms.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 5

A prism sheet was prepared as in Example 4 except that each elongated prism was provided with three (3) planar surfaces and two (2) convex curved surfaces, in which the planar surfaces showed a profile in cross section formed by connecting in order the adjacent two of four points including point 1 (−6.322, 72.265), point 2 (0.000, 0.000), point 3 (12.000, 14.687) and point 4 (15.000, 18.527) to each other and the convex curved surfaces showed a profile in cross section formed by connecting point 4 to point 5 (30.000, 39.517) by means of a circle centered at point A (−283.909, 247.987) and having a radius of 376.827 and connecting point 5 to point 6 (50.178, 72.265) by means of a circle centered at point B (−376.959, 312.857) and having a radius of 490.235.

The vertex split angle α was 5 degrees and the vertex split angle β was 39.3 degrees in the prism sheet. The angles of inclination of the two (2) planar surfaces that correspond to points 2 through 4 and the two (2) convex curved surfaces that correspond to points 4 through 6 were 50.7 degrees, 52.0 degrees, 54.4 degrees and 58.4 degrees in the ascending order.

As for the lengths L1 and L2 of the surfaces of each of the elongated prisms and the pitch P of arrangement of the elongated prisms of the prism sheet, they showed relationships of L2/P=1.560 and L2/L1=1.215. The ratio of the maximum distance d between the virtual plane connecting the vertex and the bottom of each of the elongated prisms and the actual prism face that corresponds to the points 2 through 6 to the pitch P of arrangement of the elongated prisms was d/P=3.9%. The degree of undulation of the edge lines of the elongated prisms relative to the base line was 0.053, whereas the degree of undulation of the prism face relative to the base plane was 0.036. The obtained prism sheet showed optical defects to a slight extent that had been formed during the process of molding the elongated prisms.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 6

A prism sheet was prepared as in Example 1 except that each elongated prism was provided with one (1) planar surface and one (1) convex curved surface, in which the planar surface showed a profile in cross section formed by connecting point 1 (−11.596, 65.767) to point 2 (0.000, 0.000) and the convex curved surface showed a profile in cross section formed by connecting point 2 to point 3 (44.904, 65.767) by means of a circle centered at point A (−361.105, 294.766) and having a radius of 466.137.

The vertex split angle α was 10 degrees and the vertex split angle β was 34.3 degrees in the prism sheet. The angle of inclination of the single convex curved surface that corresponds to point 2 to point 3 was 55.7 degrees.

As for the lengths L1 and L2 of the surfaces of each of the elongated prisms and the pitch P of arrangement of the elongated prisms of the prism sheet, they showed relationships of L2/P=1.409 and L2/L1=1.192. The ratio of the maximum distance d between the virtual plane connecting the vertex and the bottom of each of the elongated prisms and the actual prism face that corresponds to the point 2 to point 3 to the pitch P of arrangement of the elongated prisms was d/P=3.0%. The degree of undulation of the edge lines of the elongated prisms relative to the base line was 0.053, whereas the degree of undulation of the prism face relative to the base plane was 0.036. The obtained prism sheet showed optical defects to a slight extent that had been formed during the process of molding the elongated prisms.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 7

A prism sheet was prepared as in Example 1 except that each elongated prism was provided with one (1) planar surface and two (2) convex curved surfaces, in which the planar surface showed a profile in cross section formed by connecting point 1 (−16.005, 59.730) to point 2 (0.000, 0.000) and the convex curved surfaces showed a profile in cross section formed by connecting point 2 to point 3 (30.000, 42.238) by means of a circle centered at point A (−356.204, 284.772) and having a radius of 456.044 and connecting point 3 to point 4 (40.495, 59.730) by means of a circle centered at point B (−531.365, 390.952) and having a radius of 660.857.

The vertex split angle α was 15 degrees and the vertex split angle β was 35.4 degrees in the prism sheet. The angles of inclination of the two (2) convex curved surfaces that correspond to points 2 through 4 were 54.6 degrees and 59.0 degrees in the ascending order.

As for the lengths L1 and L2 of the surfaces of each of the elongated prisms and the pitch P of arrangement of the elongated prisms of the prism sheet, they showed relationships of L2/P=1.277 and L2/L1=1.167. The ratio of the maximum distance d between the virtual plane connecting the vertex and the bottom of each of the elongated prisms and the actual prism face that corresponds to the points 2 through 4 to the pitch P of arrangement of the elongated prisms was d/P=2.5%. The degree of undulation of the edge lines of the elongated prisms relative to the base line was 0.053, whereas the degree of undulation of the prism face relative to the base plane was 0.036. The obtained prism sheet was practically free from optical defects that could otherwise have been formed during the process of molding the elongated prisms.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 8

A prism sheet was prepared as in Example 1 except that each elongated prism was provided with one (1) planar surface and one (1) convex curved surface, in which the planar surface showed a profile in cross section formed by connecting point 1 (−14.1776, 61.4101) to point 2 (0.000, 0.000) and the convex curved surface showed a profile in cross section formed by connecting point 2 to point 3 (42.3224, 61.4101) by means of a circle centered at point A (−392.9609, 316.1078) and had a radius of 504.3237. The vertex split angle α was 13 degrees and the vertex split angle β was 34.6 degrees in the prism sheet.

As for the lengths L1 and L2 of the surfaces of each of the elongated prisms and the pitch P of arrangement of the elongated prisms of the prism sheet, they showed relationships of L2/P=1.320 and L2/L1=1.183. The ratio of the maximum distance d between the virtual plane connecting the vertex and the bottom of each of the elongated prisms and the actual prism face that correspond to the points 2 through 4 to the pitch P of arrangement of the elongated prisms was d/P=2.4%, whereas the ratio of the radius of curvature r to the pitch P of arrangement of the elongated prisms was r/P=8.93. The degree of undulation of the edge lines of the elongated prisms relative to the base line was 0.053, and the degree of undulation of the prism face relative to the base plane was 0.036. The obtained prism sheet was practically free from optical defects that could otherwise have been formed during the process of molding the elongated prisms.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 9

A prism sheet was prepared as in Example 8 except that a flat section is arranged at a position vertically separated from the trough section of any two adjacently located elongated prisms by 3 μm.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 10

A prism sheet was prepared as in Example 8 except that a flat section is arranged at a position vertically separated from the trough section of any two adjacently located elongated prisms by 5 μm.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 11

A prism sheet was prepared as in Example 8 except that a flat section is arranged at a position vertically separated from the trough section of any two adjacently located elongated prisms by 7 μm.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 12

A prism sheet was prepared as in Example 8 except that a flat section is arranged at a position vertically separated from the trough section of any two adjacently located elongated prisms by 10 μM.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

EXAMPLE 13

A prism sheet was prepared as in Example 1 except that each elongated prism was provided with one (1) planar surface and one (1) convex curved surface, in which the planar surface showed a profile in cross section formed by connecting point 1 (−19.7523, 54.2691) to point 2 (0.000, 0.000) and the convex curved surface showed a profile in cross section formed by connecting point 2 to point 3 (36.74767, 54.2691) by means of a circle centered at point A (−368.9514, 289.4066) and having a radius of 468.9151. The vertex split angle $\alpha$ was 20 degrees and the vertex split angle $\beta$ was 33.8 degrees in the prism sheet.

As for the lengths L1 and L2 of the surfaces of each of the elongated prisms and the pitch P of arrangement of the elongated prisms of the prism sheet, they showed relationships of L2/P=1.160 and L2/L1=1.135. The ratio of the maximum distance d between the virtual plane connecting the vertex and the bottom of each of the elongated prisms and the actual prism face that corresponds to the points 2 through 4 to the pitch P of arrangement of the elongated prisms was d/P=2.3%, whereas the ratio of the radius of curvature r to the pitch P of arrangement of the elongated prisms was r/P=8.30. The degree of undulation of the edge lines of the elongated prisms relative to the base line was 0.053, and the degree of undulation of the prism face relative to the base plane was 0.036. The obtained prism sheet was practically free from optical defects that could otherwise have been formed during the process of molding the elongated prisms.

A planar light source device was obtained by mounting the obtained prism sheet on the light guide of Example 1 in such a way that the elongated prism forming surface was located vis-à-vis the light emitting surface of the light guide and the edge lines of the elongated prisms were in parallel with the light incident surface of the light guide while the first prism face was located at the primary light source side. The luminance distribution of emitted light was determined in a plane perpendicular to both the light incident surface and the light emitting surface of the planar light source device and the peak luminance ratio by referring to Comparative Example 1 described hereinafter, the angle of peak light and the angular width (full width at half maximum) in which the luminance showed ½ or more of the peak luminance were measured. Table 1 summarily shows the obtained results.

A liquid crystal display element was arranged in the planar light source device to find that it operated without glaring to make the planar light source device a high quality one.

COMPARATIVE EXAMPLE 1

A planar light source device was prepared as in Example 1 except that each of the elongated prisms of the prism sheet was an isosceles triangle in cross section and the two prism faces of each elongated prism were planar surfaces, the prism vertex angle being 65.4 degrees ($\alpha=\beta=32.7$ degrees). The luminance distribution of emitted light was determined in a plane perpendicular to both the light incident surface and the light emitting surface of the planar light source device where the peak luminance value obtained was referred to as 1.0, and the angle of peak light and the angular width (full width at half maximum) in which the luminance showed ½ or more of the peak luminance were measured. Table 1 summarily shows the obtained results.

COMPARATIVE EXAMPLE 2

A planar light source device was prepared as in Example 1 except that the two prism faces of each of the elongated prisms of the prism sheet were planar surfaces and the vertex split angle $\alpha$ for one of the prism faces was 5 degrees, while the vertex split angle $\beta$ for the other prism face was 38 degrees. The luminance distribution of emitted light was determined in a plane perpendicular to both the light incident surface and the light emitting surface of the planar light source device and the peak luminance ratio by referring to Comparative Example 1, the angle of peak light and the angular width (full width at half maximum) in which the luminance showed ½ or more of the peak luminance were measured. Table 1 summarily shows the obtained results.

COMPARATIVE EXAMPLE 3

A planar light source device was prepared as in Example 1 except that the two prism faces of each of the elongated prisms of the prism sheet were planar surfaces and the vertex split angle $\alpha$ for one of the prism faces was 5 degrees, while the vertex split angle $\beta$ for the other prism face was 35 degrees. The luminance distribution of emitted light was determined in a plane perpendicular to both the light incident surface and the light emitting surface of the planar light source device and the peak luminance ratio by referring to Comparative Example 1, the angle of peak light and the angular width (full width at half maximum) in which the luminance showed ½ or more of the peak luminance were measured. Table 1 summarily shows the obtained results.

TABLE 1

|  | peak luminance ratio | peak angle (deg) | full width at half maximum (deg) |
|---|---|---|---|
| Example 1 | 1.74 | −2 | 14 |
| Example 2 | 1.80 | −3 | 13 |
| Example 3 | 1.89 | −3 | 13 |
| Example 4 | 1.92 | −2 | 13 |
| Example 5 | 1.94 | −3 | 15 |
| Example 6 | 1.82 | −3 | 13 |
| Example 7 | 1.68 | −3 | 14 |
| Example 8 | 1.76 | −1 | 14 |
| Example 9 | 1.73 | −1 | 14 |
| Example 10 | 1.71 | −1 | 14 |
| Example 11 | 1.67 | −1 | 14 |
| Example 12 | 1.63 | −1 | 14 |
| Example 13 | 1.63 | −2 | 14 |
| Comp. Example 1 | 1.00 | 0 | 22 |
| Comp. Example 2 | 1.03 | −1 | 28 |
| Comp. Example 3 | 1.19 | 1 | 24 |

INDUSTRIAL APPLICABILITY

As described above in detail, the present invention provides a light source device that can emit light efficiently and intensively by directing light emitted from a primary light source to an observing direction (with a high efficiency of utilization of light from the primary light source) by using a light deflector having a light input surface having a plurality of elongated prisms, each having two prism faces, wherein at least one of the two prism faces is a non-single planar surface and the vertex split angle α of one of the prism faces is 2 to 25 degrees while the vertex split angle β of the other prism face is 33 to 40 degrees, the absolute value of the difference (|α−β|) between the vertex split angle α and the vertex split angle β being 8 to 35 degrees.

What is claimed is:

1. A light source device comprising: a primary light source; a light guide having a light incident surface for receiving light emitted from the primary light source, guiding an incident light and having a light emitting surface for emitting a guided light; and a light deflector;

the light deflector comprising:

a light input surface for receiving incident light; and a light output surface for emitting incident light, wherein the light output surface is located on the opposite side to the light input surface, and the light input surface has a plurality of elongated prisms arranged in parallel to each other, each having a first prism face and a second prism face, and wherein the first prism face is a single planar surface, the second prism face is a non-single planar surface, a vertex split angle α of the first prison face which form each of the elongated prisms is 2 to 25 degrees while a vertex split angle β of the second prism face is 33 to 40 degrees, a difference (|α−β|) between the vertex split angle α and the vertex split angle β being 8 to 35 degrees, the first prism face is arranged to receive the incident light to introduce it into the light deflector, and the second prism face is arranged to reflect an introduced light toward the light output surface, wherein the light deflector is arranged with its light input surface located vis-à-vis the light emitting surface of the light guide, and wherein the light deflector is arranged with the first prism face of each of the elongated prisms located close to the primary light source and with the second prism face of each of the elongated prisms located remotely from the primary light source.

2. The light source device as claimed in claim 1, wherein the vertex split angle α is between 11 and 25 degrees.

3. The light source device as claimed in claim 1, wherein the non-single planar surface has at least a convex curved surface.

4. The light source device as claimed in claim 3, wherein the non-single planar surface has two or more convex curved surfaces with different inclination angles.

5. The light source device as claimed in claim 1, wherein the non-single planar surface has two or more planar surfaces with different inclination angles.

6. The light source device as claimed in claim 1, wherein the non-single planar surface has both one or more planar surfaces and one or more convex curved surfaces.

7. The light source device as claimed in any one of claims 4, 5, 6, wherein, in the non-single planar surface, one of the planar surfaces or one of the convex curved surfaces positioned at the side close to the light output surface has larger inclination angle than the other of the planar surfaces or the other of the convex curved surfaces positioned at the side close to a vertex of each of the elongated prisms.

8. The light source device as claimed in claim 7, wherein, in the non-single planar surface, a difference between an inclination angle of one of the planar surfaces or one of the convex curved surfaces closest to the light output surface and an inclination angle of the other of the planar surfaces or the other of the convex curved surfaces closest to the vertex of each of the elongated prisms is 1 to 15 degrees.

9. The light source device as claimed in any one of claims 4, 5, 6, wherein a direction of peak in a distribution of light totally reflected by each of the planar surfaces and/or each of the convex curved surfaces of the non-single planar surface and emitted from the light output surface substantially agrees with a normal direction of a plane on which the elongated prisms are formed.

10. The light source device as claimed in any one of claims 3, 5 and 6, wherein a ratio (r/P) of a radius of curvature (r) of each of the convex curved surfaces of the non-single planar surface relative to a pitch (P) of the elongated prisms is 2 to 50.

11. The light source device as claimed in claim 1, wherein a ratio (d/P) of a maximum distance (d) from the non-single planar surface to a virtual plane connecting a vertex and a bottom of each of the elongated prisms to each other relative to a pitch (P) of the elongated prisms is 0.4 to 5%.

12. The light source device as claimed in claim 1, wherein, if a coordinate system is adopted in a cross section of the elongated prisms in which a vertex of each of the elongated prisms is assumed to be an origin of the coordinate system and a length of a pitch P of the elongated prisms is normalized to 1, each of the elongated prisms shows in the cross section thereof a profile formed by connecting in order the adjacent two of sixteen (16) points of point 1 (−0.111, 1.27), point 2 (0.0, 0.0), point 3 (0.159, 0.195), point 4 (0.212, 0.260), point 5 (0.265, 0.328), point 6 (0.319, 0.398), point 7 (0.372, 0.470), point 8 (0.425, 0.544), point 9 (0.478, 0.621), point 10 (0.531, 0.699), point 11 (0.584, 0.780), point 12 (0.637, 0.861), point 13 (0.690, 0.945), point 14 (0.743, 1.030), point 15 (0.796, 1.117) and point 16 (0.889, 1.27) or their neighborhood points to each other.

13. The light source device as claimed in claim 12, wherein, if the length of the pitch P of the elongated prisms is normalized to 1 in a cross section thereof, each of the elongated prisms shows in the cross section thereof the profile formed with use of the neighborhood points located within a circle of a radius of 0.021 centered at corresponding points as to at least five points of the sixteen (16) points.

14. The light source device as claimed in claim 1, wherein, if a coordinate system is adopted in a cross section of the elongated prisms in which a vertex of each of the elongated prisms is assumed to be an origin of the coordinate system and a length of a pitch P of the elongated prisms is normalized to 1, each of the elongated prisms shows in the cross section thereof a profile formed by connecting in order the adjacent two of thirteen (13) points of point 1 (−0.206, 1.168), point 2 (0.000, 0.000), point 3 (0.159, 0.204), point 4 (0.212, 0.273), point 5 (0.265, 0.343), point 6 (0.319, 0.416), point 7 (0.372, 0.490), point 8 (0.425, 0.567), point 9 (0.478, 0.646), point 10 (0.531, 0.727), point 11 (0.584, 0.810), point 12 (0.637, 0.897) and point 13 (0.794, 1.168) or their neighborhood points to each other.

15. The light source device as claimed in claim 14, wherein, if the length of the pitch P of the elongated prisms is normalized to 1 in a cross section thereof, each of the elongated prisms shows in the cross section thereof the profile formed with use of the neighborhood points located within a circle of a radius of 0.021 centered at corresponding points as to at least five points of the thirteen (13) points.

16. The light source device as claimed in claim 1, wherein, if a coordinate system is adopted in a cross section of the elongated prisms in which a vertex of each of the elongated prisms is assumed to be an origin of the coordinate system and a length of a pitch P of the elongated prisms is normalized to 1, each of the elongated prisms shows in the cross section thereof a profile formed by connecting in order the adjacent two of twelve (12) points of point 1 (−0.284, 1.059), point 2 (0.000, 0.000), point 3 (0.212, 0.278), point 4 (0.265, 0.350), point 5 (0.319, 0.423), point 6 (0.372, 0.501), point 7 (0.425, 0.581), point 8 (0.478, 0.663), point 9 (0.531, 0.748), point 10 (0.584, 0.834), point 11 (0.637, 0.922) and point 12 (0.716, 1.059) or their neighborhood points to each other.

17. The light source device as claimed in claim 16, wherein, if the length of the pitch P of the elongated prisms is normalized to 1 in a cross section thereof, each of the elongated prisms shows in the cross section thereof the profile formed with use of the neighborhood points located within a circle of a radius of 0.021 centered at corresponding points as to at least five points of the twelve (12) points.

18. The light source device as claimed in claim 1, wherein a pitch P of the elongated prisms and a length L2 of a virtual straight line connecting a vertex and a trough section of each of the elongated prisms to each other in a cross section thereof as to the second prism face of each of the elongated prisms shows a relationship of L2/P=1.1 to 1.7.

19. The light source device as claimed in claim 1, wherein a length L1 of a virtual straight line connecting a vertex and a trough section of each of the elongated prisms each other in a cross section thereof as to the first prism face of each of the elongated prisms and a length L2 of a virtual straight line connecting a vertex and a trough section of each of the elongated prisms to each other in a cross section thereof as to the second prism face of each of the elongated prisms shows a relationship of L2/L1=1.1 to 1.3.

20. The light source device as claimed in claim 1, wherein, if a length of a pitch P of the elongated prisms is normalized to 1, an edge line formed by the first and second prism faces of each of the elongated prisms is undulated by 0.018 to 0.354 relative to its base line.

21. The light source device as claimed in claim 1, wherein, if a length of a pitch P of the elongated prisms is normalized to 1, the first and second prism faces of each of the elongated prisms are undulated by 0.012 to 0.334 relative to their respective base planes.

22. The light source device as claimed in claim 1, wherein a flat section is arranged between the adjacent two of the elongated prisms.

23. The light source device as claimed in claim 22, wherein the flat section is arranged at a position vertically separated from the trough section of each of the elongated prisms by 2 to 10 μm.

24. The light source device as claimed in claim 22, wherein, if a length of a pitch P of the elongated prisms is normalized to 1, the flat section is arranged at a position vertically separated from a trough section of each of the elongated prisms by 0.035 to 0.18.

25. The light source device as claimed in claim 22, wherein, if a length L2 of a virtual straight line connecting a vertex and a trough section of each of the elongated prisms to each other in a cross section thereof as to the second prism face of each of the elongated prisms is normalized to 1, the flat section is arranged at a position vertically separated from the trough section of each of the elongated prisms by 0.022 to 0.16.

26. The light source device as claimed in claim 1, wherein the primary light source is arranged adjacent to a corner section of the light guide and the elongated prisms of the light deflector are arranged substantially concentrically and centered substantially at the primary light source.

27. The light source device as claimed in claim 1, wherein a light diffuser is arranged adjacent to the light output surface of the light deflector with a full width at half maximum of a distribution of emitted light showing anisotropy when receiving collimated light.

28. A light source device comprising: a primary light source; a light guide having a light incident surface for receiving light emitted from the primary light source, guiding an incident light and having a light emitting surface for emitting a guided light; and a light deflector;
    the light deflector comprising:
    a light input surface for receiving incident light and a light; and
    a light output surface for emitting incident light,
    wherein the light output surface is located on the opposite side to the light input surface, and the light input surface has a plurality of elongated prisms arranged in parallel to each other, each having a first prism face and a second prism face,
    wherein the first prism face is a single planar surface, the second prism face is a non-single planar surface, a vertex split angle α of the first prism face which form each of the elongated prisms is 2 to 25 degrees while a vertex split angle β of the second prism face is 33 to 40 degrees, the first prism face is arranged to receive the incident light to introduce it into the light deflector, and the second prism face is arranged to reflect an introduced light toward the light output surface, and
    wherein, if a length of a pitch P of the elongated prisms is normalized to 1, an edge line formed by the first and second prism faces of each of the elongated prisms is undulated by 0.018 to 0.354 relative to its base line,
    wherein the light deflector is arranged with its light input surface located vis-à-vis the light emitting surface of the light guide, and
    wherein the light deflector is arranged with the first prism face of each of the elongated prisms located close to the primary light source and with the second prism face of each of the elongated prisms located remotely from the primary light source.

29. The light source device as claimed in claim 28, wherein the primary light source is arranged adjacent to a corner section of the light guide and the elongated prisms of the light deflector are arranged substantially concentrically and centered substantially at the primary light source.

30. The light source device as claimed in claim 28, wherein a light diffuser is arranged adjacent to the light output surface of the light deflector with a full width at half maximum of a distribution of emitted light showing anisotropy when receiving collimated light.

31. A light source device comprising: a primary light source; a light guide having a light incident surface for receiving light emitted from the primary light source, guiding an incident light and having a light emitting surface for emitting a guided light; and a light deflector;
    the light deflector comprising:
    a light input surface for receiving incident light and a light; and
    a light output surface for emitting incident light,
    wherein the light output surface is located on the opposite side to the light input surface, and the light input surface has a plurality of elongated prisms arranged in parallel to each other, each having a first prism face and a second prism face,
    wherein the first prism face is a single planar surface, the second prism face is a non-single planar surface, a vertex split angle α of the first prism face which form each of the elongated prisms is 2 to 25 degrees while a vertex split angle β of the second prism face is 33 to 40 degrees, the first prism face is arranged to receive the incident light to introduce into the light deflector, and the second prism face is arranged to reflect an introduced light toward the light output surface, and wherein, if a length of a pitch P of the elongated prisms is normalized to 1, the first and second prism faces of each of the elongated prisms are undulated by 0.012 to 0.334 relative to their respective base planes, wherein the light deflector is arranged with its light input surface located vis-à-vis the light emitting surface of the light guide, and wherein the light deflector is arranged with the first prism face of each of the elongated prisms located close to the primary light source and with the second prism face of each of the elongated prisms located remotely from the primary light source.

32. The light source device as claimed in claim 31, wherein the primary light source is arranged adjacent to a corner section of the light guide and the elongated prisms of the light deflector are arranged substantially concentrically and centered substantially at the primary light source.

33. The light source device as claimed in claim 31, wherein a light diffuser is arranged adjacent to the light output surface of the light deflector with a full width at half maximum of a distribution of emitted light showing anisotropy when receiving collimated light.

* * * * *